(12) United States Patent
Smith et al.

(10) Patent No.: US 8,978,241 B2
(45) Date of Patent: Mar. 17, 2015

(54) PALLET REFURBISHING APPARATUS AND METHOD

(71) Applicant: CLM Pallet Recycling, Inc., Indianapolis, IN (US)

(72) Inventors: Derrick L. Smith, Waxhaw, NC (US); Barry J. Davignon, Terre Haute, IN (US)

(73) Assignee: CLM Pallet Recycling, Inc., Indianapolis, IN (US)

( * ) Notice: Subject to any disclaimer, the term of this patent is extended or adjusted under 35 U.S.C. 154(b) by 0 days.

(21) Appl. No.: 13/955,048

(22) Filed: Jul. 31, 2013

(65) Prior Publication Data

US 2014/0033495 A1    Feb. 6, 2014

Related U.S. Application Data

(60) Provisional application No. 61/798,571, filed on Mar. 15, 2013, provisional application No. 61/677,789, filed on Jul. 31, 2012.

(51) Int. Cl.
    B23P 19/00    (2006.01)
    B23P 19/04    (2006.01)
    B23P 6/00     (2006.01)

(52) U.S. Cl.
    CPC .................................. *B23P 19/041* (2013.01)
    USPC .............. 29/700; 29/239; 29/244; 29/402.01; 29/426.1; 29/426.3; 29/426.5; 29/799

(58) Field of Classification Search
    CPC ......... B08B 9/083; B23P 19/025; B23P 6/00; B23P 6/04; B23P 2700/01; B23P 11/025; B23P 19/06; B23P 19/02; B23P 19/00; B23P 19/041; B23P 19/04; A61M 5/002; A61M 5/1785; B60T 17/221; B25B 27/22; B25B 27/14; B25B 27/00; B25B 27/02; B25B 27/0035; B25B 27/06; B25B 27/023; B25B 27/04; B25B 27/026; A63C 17/06; A63C 17/226; B02C 13/26; B02C 13/095; B05C 5/0254; B23K 1/018; B09B 5/00; B09B 27/026; B29B 17/02; B21D 53/88
    USPC ........... 29/426.3, 402.01, 402.03, 426.1, 799, 29/244, 700, 239, 426.5
    See application file for complete search history.

(56) References Cited

U.S. PATENT DOCUMENTS 2,029,885 A * 2/1936 Mann ............................. 254/124
2,593,843 A * 4/1952 Cannon ......................... 29/33 R
(Continued)

FOREIGN PATENT DOCUMENTS

AU    2004205273    3/2005
AU    2004205279    3/2005
(Continued)

OTHER PUBLICATIONS

International Search Report and Written Opinion issued in International Application No. PCT/US2013/052842 Oct. 17, 2013.
(Continued)

*Primary Examiner* — Essama Omgba
*Assistant Examiner* — Darrell C Ford
(74) *Attorney, Agent, or Firm* — Daniel L. Boots; Brian W. Chellgren; Bingham Greenebaum Doll LLP

(57) ABSTRACT

A method and apparatus is described for disassembling a wooden pallet by mechanically and automatically removing a pre-selected damaged board from the pallet, comprising a frame intended to be arranged in close proximity with a conveyor and a bi-directional rotating ram assembly mounted within the frame and carrying spikes thereupon. The invention is configured such that the ram assembly is moved into a board-engaging position to enable the spike to puncture and fasten to a predetermined (damaged) board of the pallet, and to thereafter be moved up and away from the pallet in order to remove and separate the board from the pallet.

14 Claims, 34 Drawing Sheets

(56) References Cited

U.S. PATENT DOCUMENTS

| | | | | |
|---|---|---|---|---|
| 3,512,242 | A * | 5/1970 | Harvis | 29/252 |
| 3,525,503 | A | 8/1970 | Hebert | |
| 3,740,815 | A | 6/1973 | Campbell et al. | |
| 3,846,890 | A * | 11/1974 | Bielkiewicz | 29/239 |
| 3,988,822 | A * | 11/1976 | Lopez et al. | 29/426.5 |
| 3,991,459 | A | 11/1976 | Rapp | |
| 4,051,588 | A | 10/1977 | Conkle | |
| 4,089,098 | A * | 5/1978 | DeMarco | 29/239 |
| 4,112,578 | A * | 9/1978 | Sanford | 29/700 |
| 4,152,819 | A | 5/1979 | Conkle | |
| 4,241,495 | A * | 12/1980 | Wakeem | 29/700 |
| 4,285,110 | A | 8/1981 | Fagre, Jr. | |
| 4,320,570 | A * | 3/1982 | Williams | 29/564.3 |
| 4,346,506 | A | 8/1982 | Martindale | |
| 4,373,651 | A * | 2/1983 | Fanslow | 227/3 |
| 4,392,403 | A | 7/1983 | Martindale, Jr. | |
| 4,421,353 | A * | 12/1983 | Smith, Jr. | 294/82.1 |
| 4,435,892 | A * | 3/1984 | Williams | 29/239 |
| 4,492,016 | A * | 1/1985 | Smets et al. | 29/432 |
| 4,586,235 | A | 5/1986 | Benvenuto | |
| 4,676,000 | A | 6/1987 | James | |
| 4,757,599 | A * | 7/1988 | Bane | 29/564.3 |
| 4,945,626 | A * | 8/1990 | Dykstra et al. | 29/564.3 |
| 5,121,540 | A * | 6/1992 | Dykstra | 29/772 |
| 5,201,110 | A * | 4/1993 | Bane | 29/564.3 |
| 5,307,554 | A * | 5/1994 | Johnson et al. | 29/564.3 |
| 5,423,114 | A * | 6/1995 | Johnson | 29/267 |
| 5,447,289 | A * | 9/1995 | Callahan | 254/131 |
| 5,457,869 | A * | 10/1995 | Doyle | 29/564.3 |
| 5,463,808 | A * | 11/1995 | Harris | 29/823 |
| 5,467,516 | A * | 11/1995 | DeGeorge | 29/239 |
| 5,600,882 | A * | 2/1997 | Beane | 29/822 |
| 5,848,459 | A * | 12/1998 | Minick | 29/426.5 |
| 6,032,351 | A * | 3/2000 | Beane | 29/564.3 |
| 6,058,586 | A * | 5/2000 | Bowling et al. | 29/402.11 |
| 6,154,955 | A * | 12/2000 | Beane | 29/822 |
| 6,302,375 | B1 * | 10/2001 | Heil et al. | 254/17 |
| 6,687,970 | B2 * | 2/2004 | Waechter et al. | 29/426.4 |
| 6,829,822 | B1 * | 12/2004 | Minick | 29/772 |
| 6,865,975 | B2 * | 3/2005 | Waechter et al. | 83/425 |
| 7,765,668 | B2 * | 8/2010 | Townsend et al. | 29/407.04 |
| 7,954,240 | B2 * | 6/2011 | Holliger | 29/897.31 |
| 7,958,624 | B2 * | 6/2011 | Townsend et al. | 29/705 |
| 8,261,643 | B2 * | 9/2012 | Cosgrove et al. | 83/13 |
| 8,266,790 | B2 * | 9/2012 | Townsend et al. | 29/772 |
| 8,752,457 | B1 * | 6/2014 | Cosgrove et al. | 83/13 |
| 2007/0107212 | A1 * | 5/2007 | Holliger | 29/772 |
| 2007/0143979 | A1 * | 6/2007 | Townsend et al. | 29/402.01 |
| 2007/0163099 | A1 * | 7/2007 | Townsend et al. | 29/402.01 |
| 2009/0169353 | A1 | 7/2009 | Townsend et al. | |
| 2009/0188096 | A1 * | 7/2009 | Townsend et al. | 29/426.1 |
| 2011/0197729 | A1 * | 8/2011 | Cosgrove et al. | 83/39 |
| 2012/0284987 | A1 * | 11/2012 | Townsend et al. | 29/426.3 |

FOREIGN PATENT DOCUMENTS

| | | |
|---|---|---|
| AU | 2004205282 | 3/2005 |
| DE | 9106889.4 | 3/1992 |
| DE | 29613301 | 11/1996 |
| EP | 0943394 | 9/1999 |
| GB | 2436101 | 9/2007 |
| JP | 2007119035 | 5/2007 |
| RU | 2368483 | 9/2009 |
| WO | 2012067581 | 5/2012 |

OTHER PUBLICATIONS

"Suppliers Offer Variety of Bandsaw, Shear Machines for Disassembly," Pallet Enterprise, http://222.palletenterprise.com/articledatabase/view.asp?articleID=805) Nov. 1, 2002.

"DeckmasterTM Lead-Bore Remover and Nail Depressor," Automated Machine Systems, Inc., http://automatedmachinesystems.com/index.php/new-equipment/detail/deckmaster-lead-board-remover-nail-depressor/ Jul. 11, 2013.

"JOINTEC D-Flex Pallet Dismantler," http://www.youtube.com/watch?v=2h6q1JHelfE Feb. 23, 2010.

"Rotary Pallet Dismantlers," http://www.pallet-repair.com/Equipment/Repair-Recycling/Rotary-Pallet-Dismantlers.aspx 2011.

"AMEX Pallets Benefits from PRS Automation," Pallet Enterprise, http://www.pallet-repair.com/Data/News/AMEXFebruary2011.pdf Feb. 2011.

"Pallet Recyclers Can Start Small; Getting Lumber for Free is a Key," Pallet Enterprise, http://www.accordleasing.com/forms/Pallet_Recyclers_industry_publication_website.pdf.

"L.A. Pallet Supplier Focuses on Recycling, Quality, Service: Eagle Metal Connector Plates Help Santa Fe Pallet Produce No. 1 Pallets," Pallet Enterprise, http://www.palletenterprise.com/articledatabase/view.asp?articleID=2885 Jul. 1, 2009.

* cited by examiner

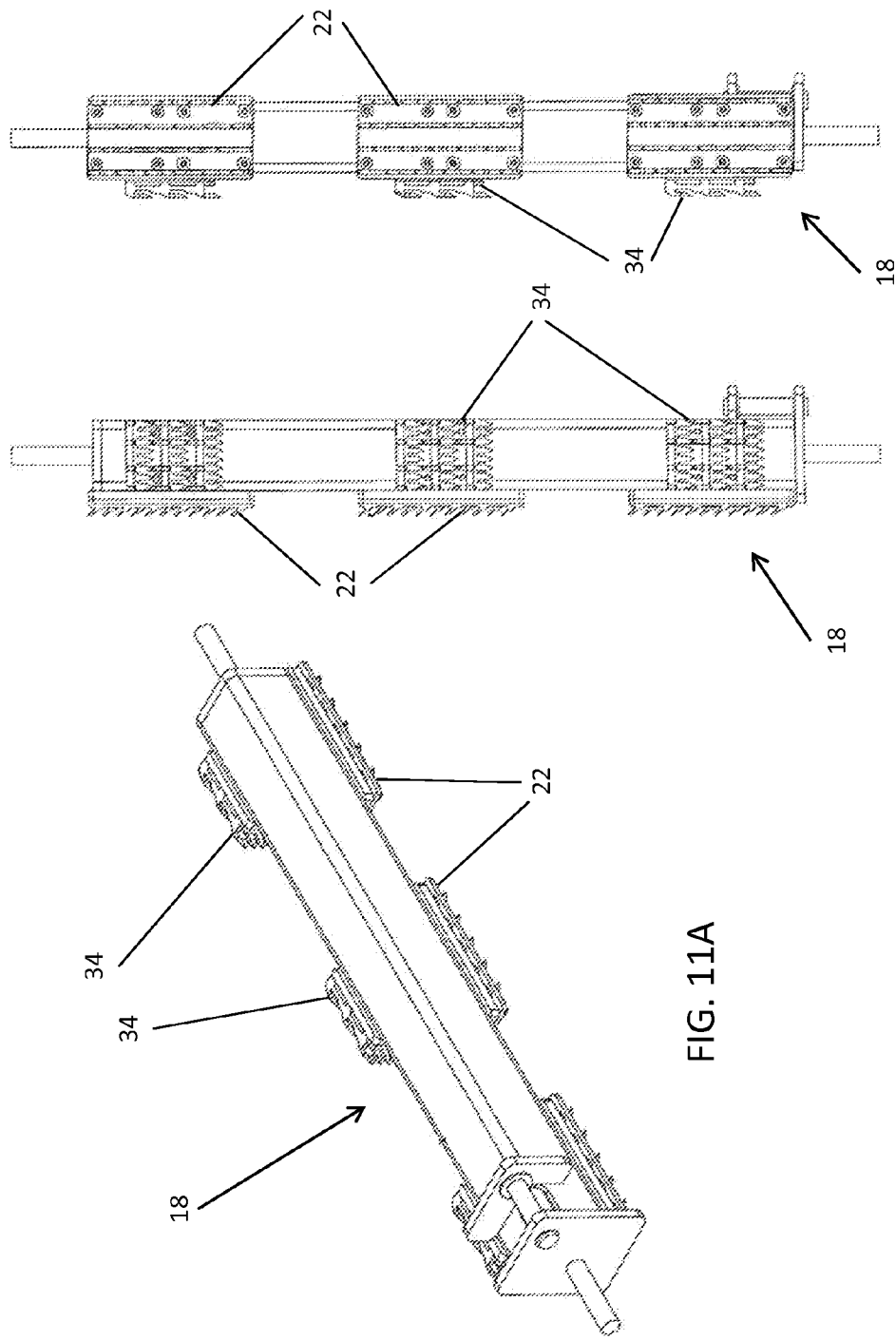

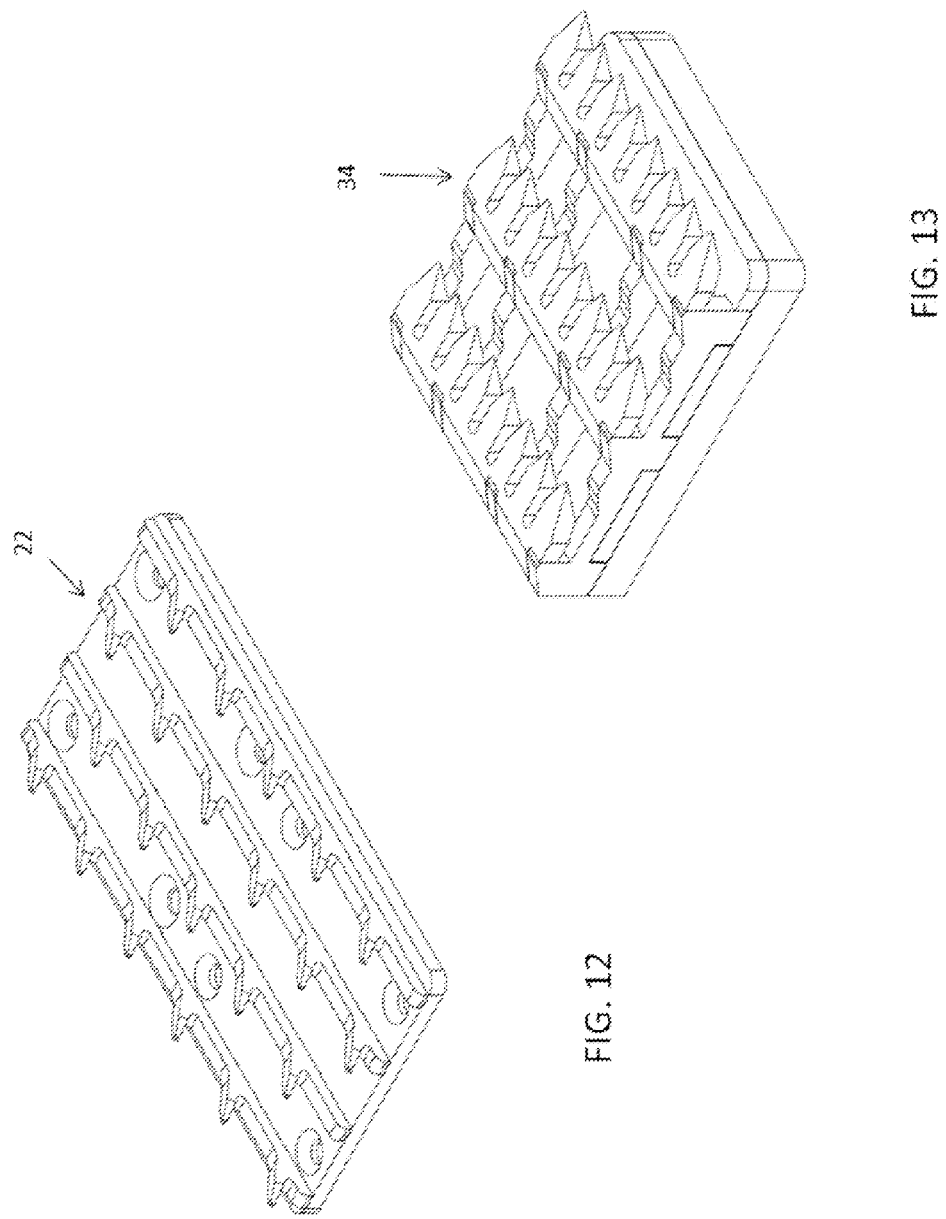

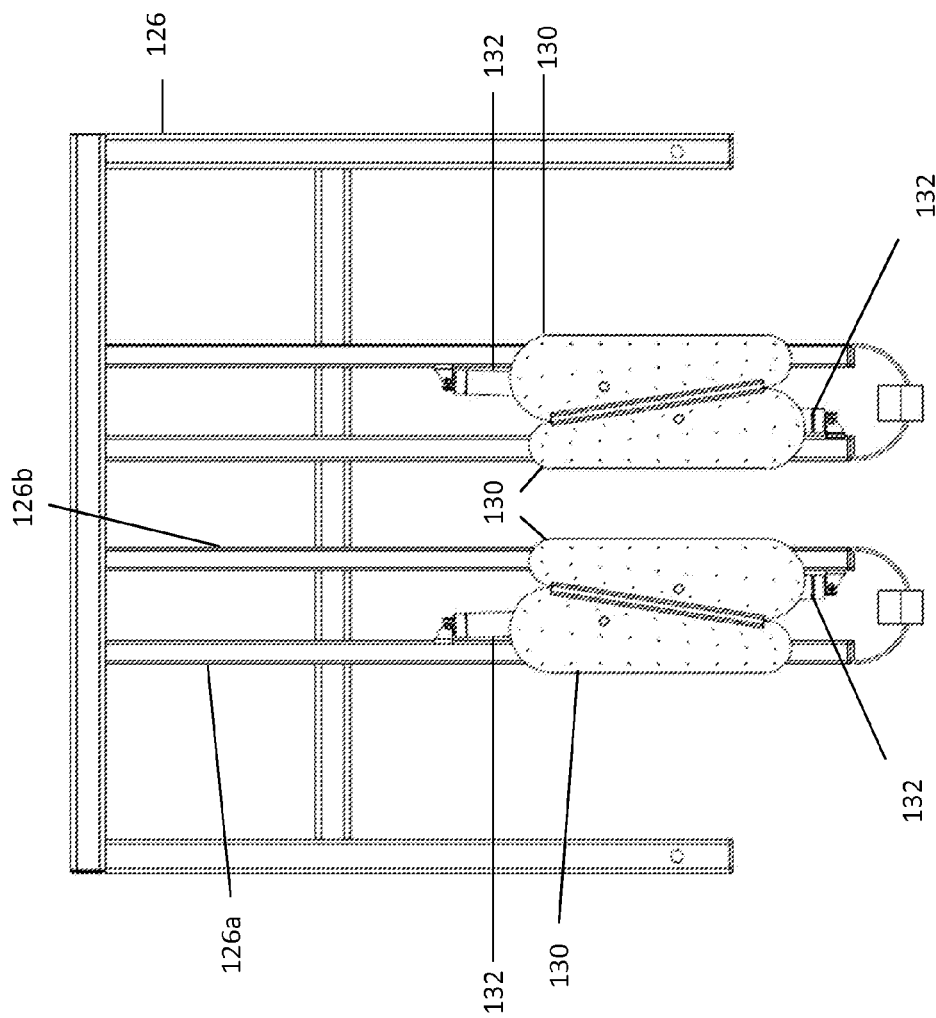

PALLET REFURBISHING APPARATUS AND METHOD

CROSS REFERENCE TO RELATED APPLICATIONS

This application claims the benefit of priority to U.S. Provisional Patent Application Ser. No. 61/798,571, filed Mar. 13, 2013, for IMPROVED AUTOMATED PALLET REFURBISHING APPARATUS AND METHOD, incorporated herein by reference. This application also claims the benefit of priority to U.S. Provisional Patent Application Ser. No. 61/677,789, filed Jul. 31, 2012, for AUTOMATED PALLET REFURBISHING APPARATUS AND METHOD, incorporated herein by reference.

BACKGROUND OF THE INVENTION (a) Field of the Invention

The present disclosure relates to machinery and processes for refurbishing pallets. More specifically, the present disclosure relates to an automated process and apparatus for removing broken or damaged slats or boards from a pallet to facilitate the easy replacement of the damaged slat or board, thereby refurbishing and prolonging the useful life of the pallet.

(b) Description of the Prior Art

Pallets are flat transport structures, typically made of wood, used to support goods. A common pallet is typically constructed in layers—a bottom layer, a top layer, a middle layer connecting the top and bottom layers in a spaced apart relationship, and, optionally, an intermediate layer. The bottom layer and top layers will commonly comprise a number of deck boards that typically run parallel with one another with some or no spacing between each board, although some bottom deck boards can run perpendicular to other bottom deck boards to allow for spacing therebetween. The top deck boards provide a deck or flat platform for goods to be placed on the top deck.

Pallets are not gently used and often sustain damage. Pallets are typically lifted by forklifts, pallet jacks, front loaders, or other jacking devices. Operator error can result in jacking devices colliding with pallets, which may result in damaged or broken deck boards. Unloaded pallets are often lifted and, although inadvisable, thrown or dropped by operators. Rough usage can damage pallets, which then become safety risks. When parts of a pallet break, a load supported by the pallet may become destabilized. Furthermore, breakage of a deck board may expose nails or sharp edges.

Traditionally, damaged pallets are either discarded or manually repaired. An operator removes a damaged or broken deck board using a crowbar or similar tool, then nails or otherwise fastens a replacement deck board to the pallet. This manual repair process is time consuming and physically wearing on operators.

SUMMARY

The present disclosure relates to an automated apparatus for refurbishing a pallet by removing a damaged board therefrom. The present disclosure also relates to a method for refurbishing a pallet by removing a damaged board therefrom.

One aspect of the present invention pertains to an automated board-removing apparatus comprising: a ram assembly carrying spikes; and a spacer assembly configured to secure a pallet with a predetermined board of the pallet at an operable position; where the ram assembly is configured to move into a board-engaging position to enable said spikes to engage the predetermined board, and to thereafter move away from the pallet to remove the predetermined board from the pallet.

In some embodiments of this aspect, the ram assembly is suspended from a ram frame. In further embodiments, a drive cylinder connected to the ram frame and the ram assembly is operable to move the ram assembly between a start position, the board-engaging position, and an end position. In certain embodiments, movement of the ram assembly between the start position, the board-engaging position, and the end position defines an arc, the board-engaging position being the lowest position of the arc. In some embodiments of this aspect, the apparatus includes means for rotating the ram assembly, such as, for example, an electric motor or a hydraulic or pneumatic cylinder.

In certain embodiments, the spacer assembly includes a spacer frame and at least one spacer extending therefrom. In further embodiments, the spacer is sized to extend within said pallet and configured to reversibly expand to press against an interior of the pallet. In some embodiments, the spacer includes two parallel rail members and an expandable bladder positioned between the rail members. In further embodiments, the apparatus includes springs connecting the rail members, the springs biased to draw the rail members together. In some embodiments, the spacer includes a plurality of pads, the pads configured to transition from a retracted state to an expanded state. In certain embodiments, each pad is connected to the support frame by an actuating cylinder, whereby actuation of the cylinders transitions the pads from the retracted state to the expanded state.

In some embodiments, the ram assembly further comprises a push plate, the spikes extending through the push plate. In further embodiments, the spikes are carried on a first side of the ram assembly and a rake is carried on a second side of the ram assembly. In certain embodiments, the spikes are carried on a first side and a second side of the ram assembly.

Another aspect of the present invention pertains to a method of removing a board from a pallet, comprising the steps of: (a) providing a pallet; (b) providing a ram assembly movable relative to the pallet; (c) identifying the position of a board to be removed from the pallet; (d) translating the ram assembly to a position to engage the board; (e) engaging the board with the ram assembly; and (f) translating the ram assembly away from the pallet to remove the board from the pallet.

In some embodiments, the ram assembly includes spikes configured to engage the predetermined board. In further embodiments, step (e) includes puncturing the predetermined board with the spikes.

In some embodiments, the method includes (g) ejecting the predetermined board from the ram assembly. In further embodiments, (g) includes initially rotating the ram assembly prior to ejecting the predetermined board from the ram assembly. In certain embodiments, the spikes are attached to a first side of the ram assembly and a rake is attached to a second side of the ram assembly. In further embodiments, the method includes (h) translating the ram assembly to move the rake across the pallet. In some embodiments, the spikes are attached to a first side and a second side of the ram assembly.

In further embodiments, the method includes (h) identifying the position of a second board to be removed from the pallet; (i) rotating the ram assembly to orient the second side in the direction of the pallet; (j) translating the ram assembly to a position to engage the second board; (k) engaging the second board with spikes on the second side of the ram assembly; and (l) translating the ram assembly away from the pallet to remove the second board from the pallet.

In some embodiments, (g) includes ejecting the board onto a conveyor configured to translate the board away from the ram assembly. In further embodiments, (c) further comprises securing the pallet in position relative to the ram assembly. In certain embodiments, securing the pallet includes inserting a spacer into the pallet then reversibly expanding the spacer to press against the pallet. In some embodiments, expanding the spacer includes laterally expanding the spacer by inflating a bladder within the spacer. In certain embodiments, the spacer includes a plurality of pads and wherein expanding the spacer includes translating the pads relative to each other to increase their width.

In certain embodiments, the translating in (d) is translating the ram assembly parallel to a longitudinal axis of the board. In further embodiments, the translating in (d) is translating the ram assembly perpendicular to a longitudinal axis of the board.

BRIEF DESCRIPTION OF THE DRAWINGS

FIG. 11A shows a perspective view of the ram in isolation carrying spike plates and rake plates. FIG. 11B shows a second side view of the ram of FIG. 11A. FIG. 11C shows a first side view of the ram of FIG. 11A.

FIG. 12 is a perspective view of an individual spike plate in isolation.

FIG. 13 is a perspective view of an optional rake plate in isolation.

FIG. 18 is a top plan view of the spacer support frame of the second embodiment with the spacers in a retracted position.

FIG. 20A shows the pads arranged side-by-side in their retracted state and FIG. 20B shows the pads in a displaced arrangement in their extended or expanded state.

DESCRIPTION OF THE INVENTION

Figure 1A:
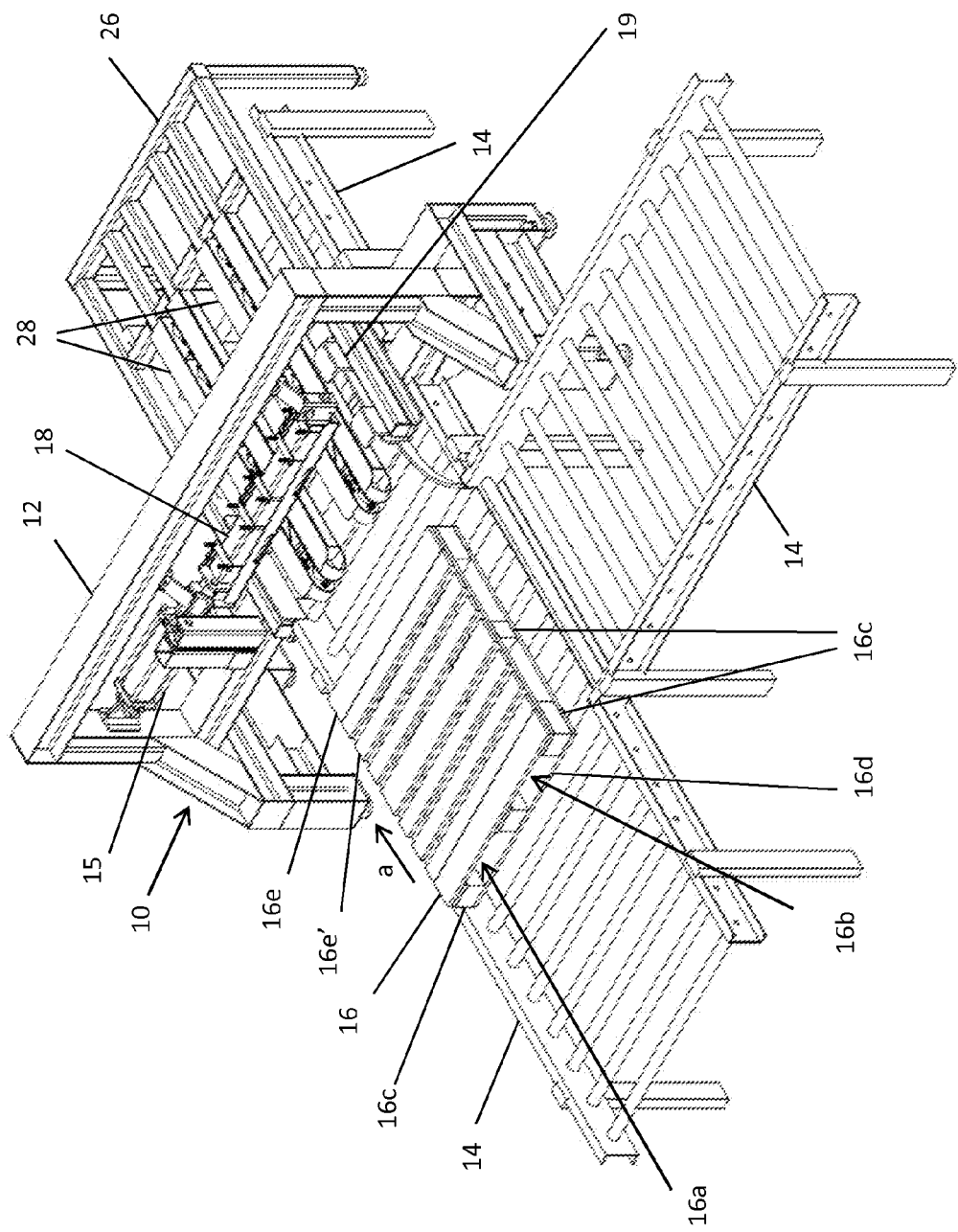
FIG. 1A is a perspective view of a first embodiment of an apparatus for refurbishing pallets positioned in conjunction with a pallet conveyor system.

For the purpose of promoting an understanding of the principles of the invention, reference will now be made to certain embodiments illustrated in the disclosure, and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

While the inventions have been illustrated and described in detail in the drawings and foregoing description, the same is to be considered as illustrative and not restrictive in character, it being understood that the preferred embodiment has been shown and described and that changes and modifications that come within the spirit of the invention are desired to be protected.

Figure 1B:
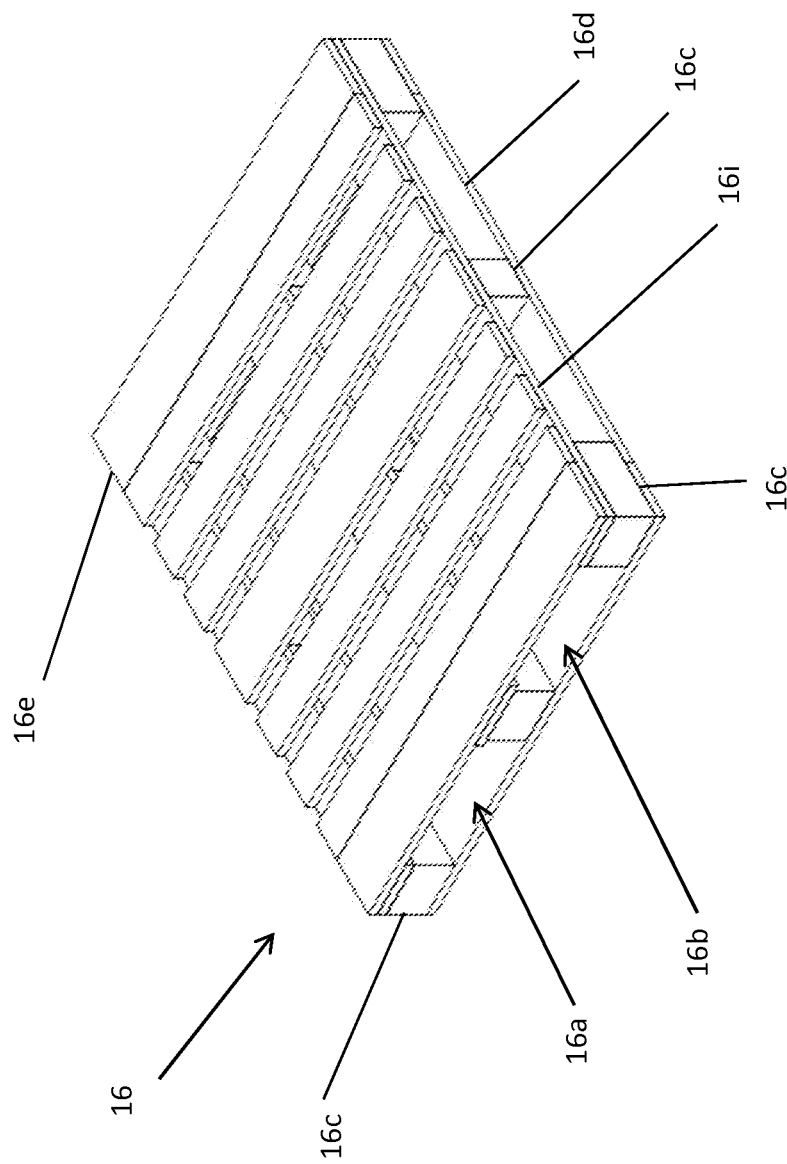
FIG. 1B is a perspective view of a pallet.
Figure 2:
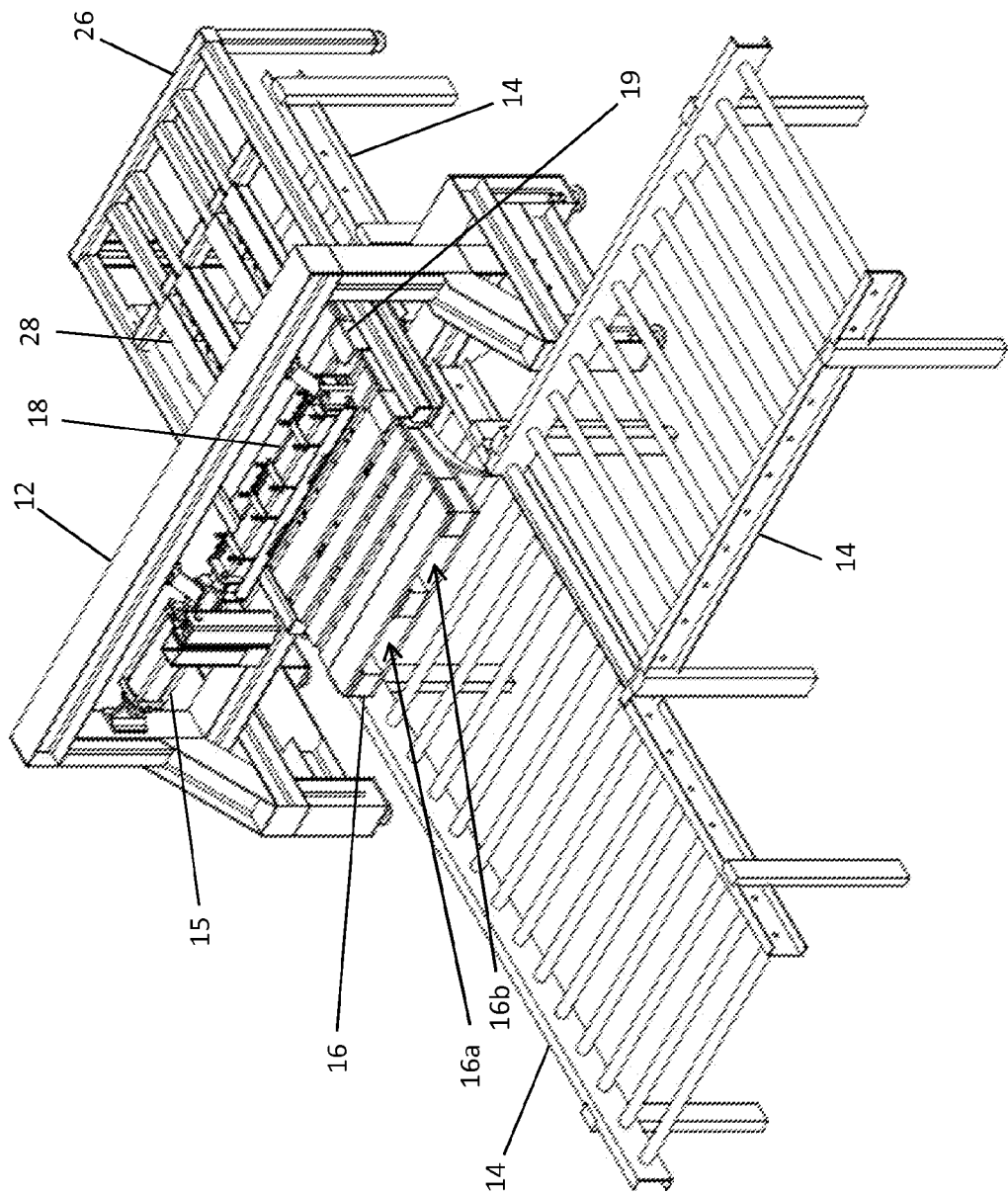
FIG. 2 is a perspective view of the first embodiment shown in FIG. 1A with the pallet in an operable position.
Figure 3:
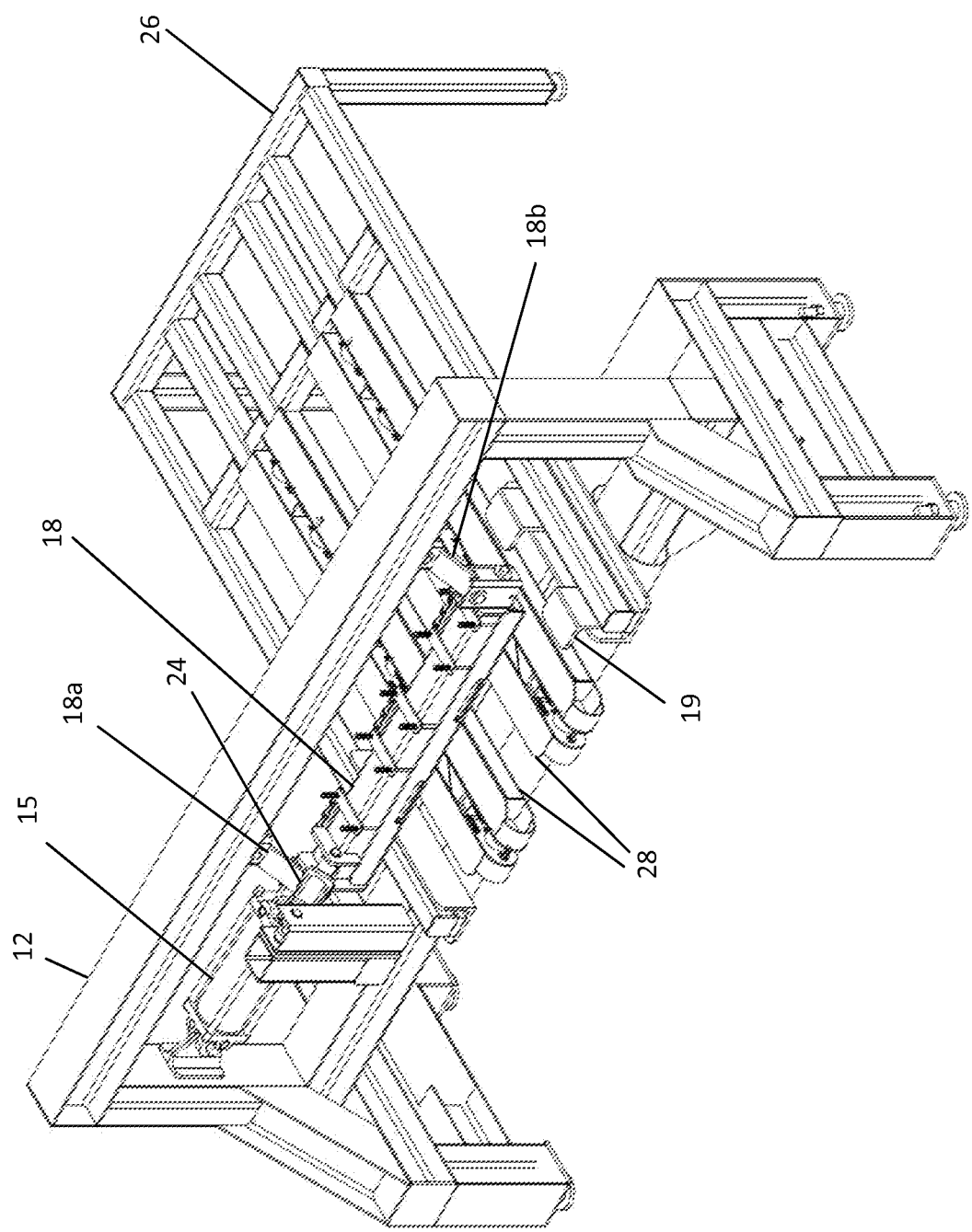
FIG. 3 is a perspective view of the ram support frame and the spacer support frame of the first embodiment in combination without a pallet, the board-engaging surface of the board-removal assembly carried by the ram disposed in a downward orientation and the spacers in a retracted position.
Figure 4:
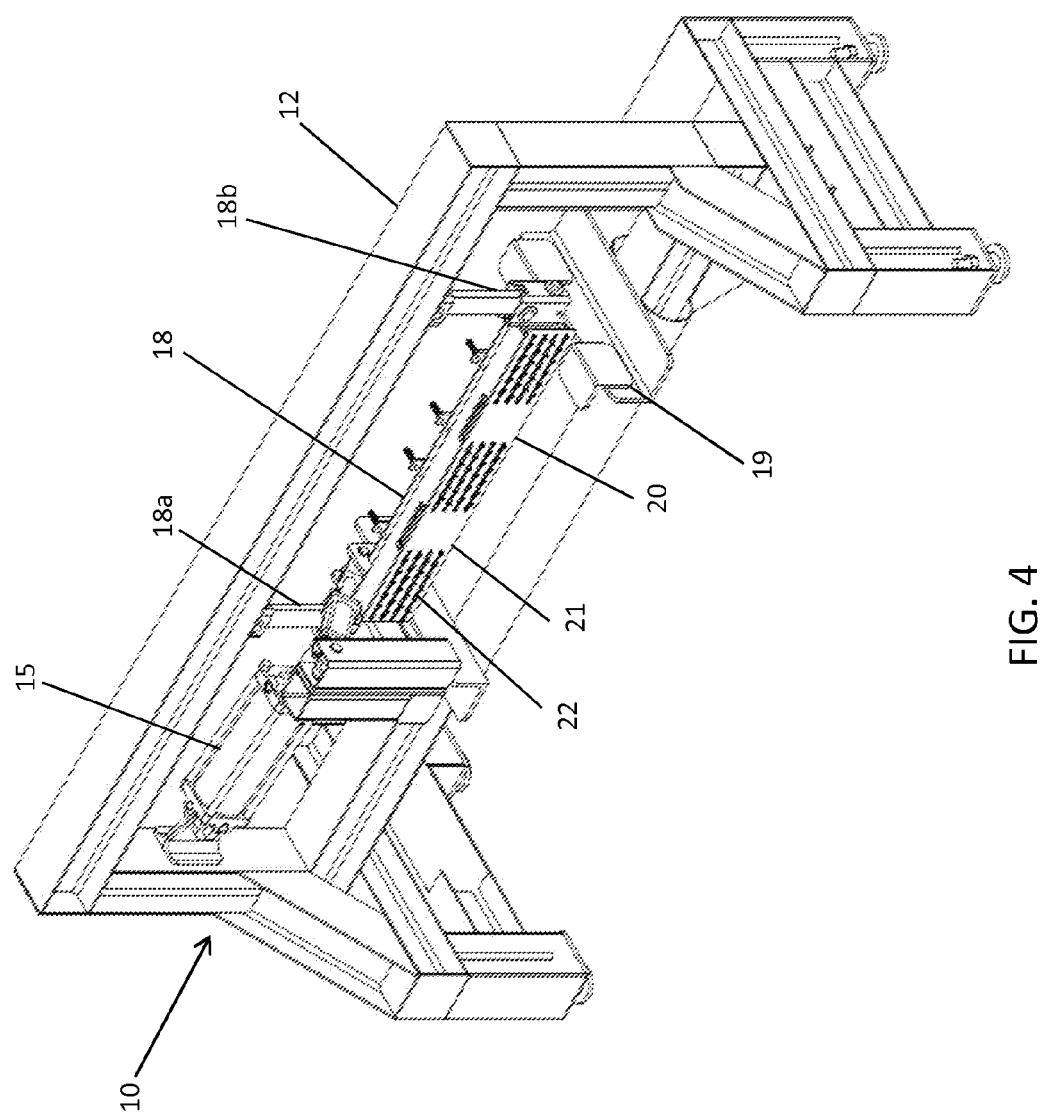
FIG. 4 is a perspective view of the board-removal assembly carried by the ram shown in isolation without a pallet, with the board-engaging surface of the assembly disposed in the vertical position.
Figure 5:
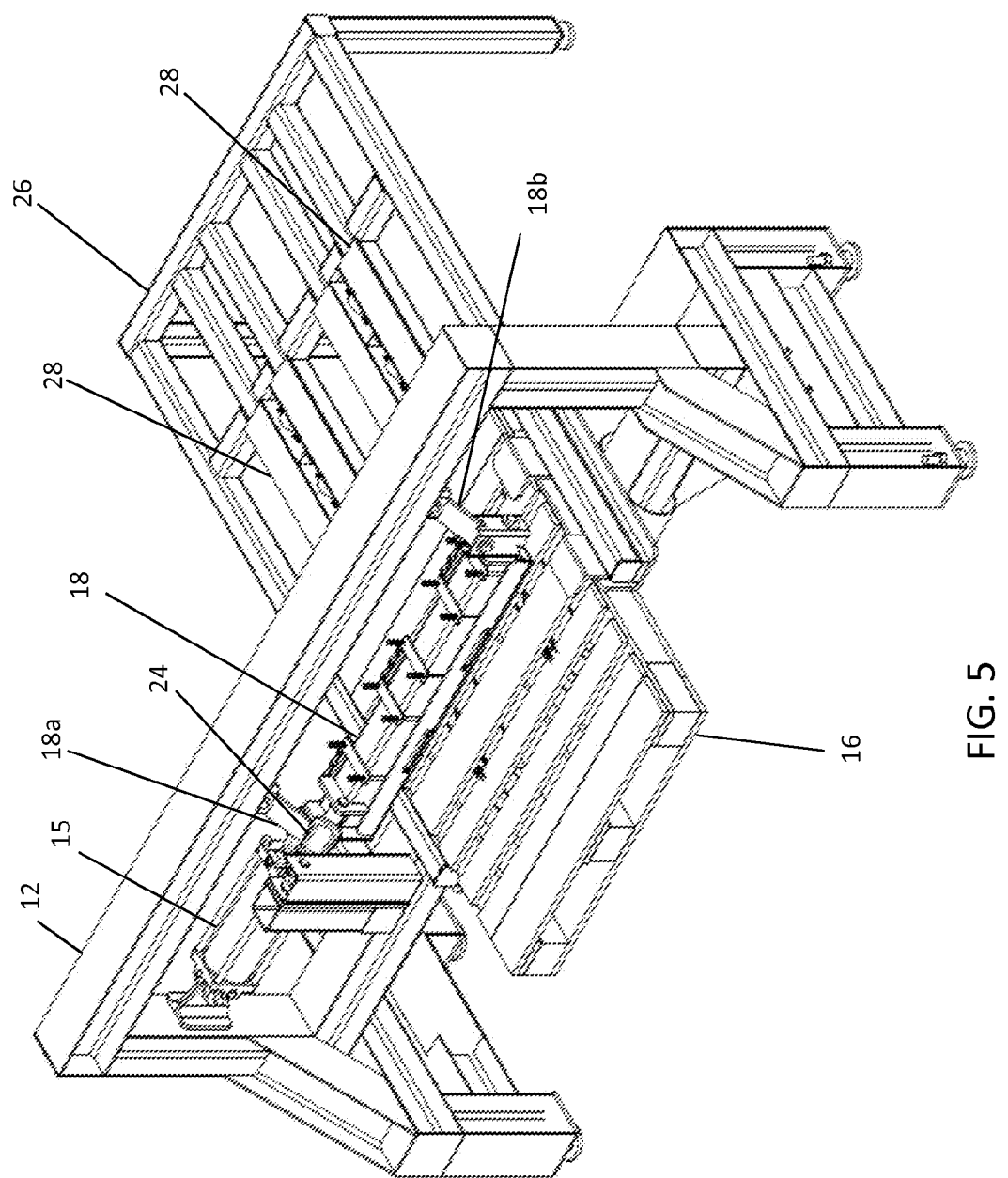
FIG. 5 is a perspective view of the first embodiment showing the ram that supports and carries the board-removal assembly shown in combination with a pallet, wherein the ram is in a first start position.

Referring now to FIGS. 1-16, a first embodiment of an automated apparatus 10 for refurbishing or recycling a pallet 16 is shown. As best shown in FIG. 1B, a common pallet 16 is typically constructed in layers—a bottom layer, a top layer, a middle layer and an intermediate layer. The bottom layer 16d will commonly comprise a number of bottom deck boards that can either run parallel with one another with some or no spacing between each board, or some bottom deck boards can run perpendicular to other bottom deck boards to allow for spacing therebetween. The top layer 16e also preferably comprises a number of deck boards that typically likewise run parallel with one another. Their purpose is to provide a deck or flat platform for goods to be placed on the top deck. The top deck boards, while running parallel with one another, can likewise be arranged with some or no spacing between them. For clarification, the longitudinal axis or length of a board is the longest dimension of the board.

The middle layer 16c of the pallet is used to provide a supporting connection of the bottom deck boards 16d to the top deck boards 16e, as well as vertical spacing between the top and bottom of the pallet, thereby defining open areas 16a and 16b which can accommodate the tines of a fork lift or hand truck device for transporting the pallet. The middle layer 16c can be composed of various types of components to join the bottom deck 16d to the top deck 16e. Typically, blocks of material are used interspersed throughout the middle layer. When such blocks are used to define the middle layer, the bottom deck boards are typically fastened directly to the blocks to secure the bottom layer 16d to the bottom side of the middle layer 16c. In addition, when the middle layer has such blocks, there will commonly be an additional intermediate layer 16i arranged between the top layer 16e and the middle layer 16c. This intermediate layer 16i allows for the top deck boards to connect to the middle layer blocks via the intermediate layer. These intermediate boards 16i, commonly referred to as "runners" or "stringers," will typically run perpendicular to the top deck boards 16e.

A preferred pallet suitable for use with this invention may be wood or non-wood, and selected from the group consisting of a block pallet, a double-face pallet, a double-wing pallet, a flush pallet, a four-way stringer, a non-reversible pallet, a reversible pallet, a single-face pallet, a single wing pallet, a skid pallet, a solid deck pallet, and two-way and four-way stringer pallets.

Referring now to apparatus 10, the apparatus 10 preferably includes a support frame 12, a bi-directional rotating ram 18 mounted on the frame 12 and driven by a drive cylinder 15, and a spacer support frame 26. Drive cylinder 15 may be pneumatic or hydraulic, but, in some embodiments, is preferably hydraulic. Spacer support frame 26 supports one or more spacers 28, within which are located spacer cams or blocks 30 (see FIGS. 7A-C for greater detail). Apparatus 10 is usually arranged closely adjacent a conveyor 14, which is configured for moving a pallet 16 into position in the direction of reference arrow "a" in FIG. 1A to receive the spacers 28 for proper alignment for the purpose of removing a damaged board or slat (for example, board 16e') from the pallet.

Figure 6:
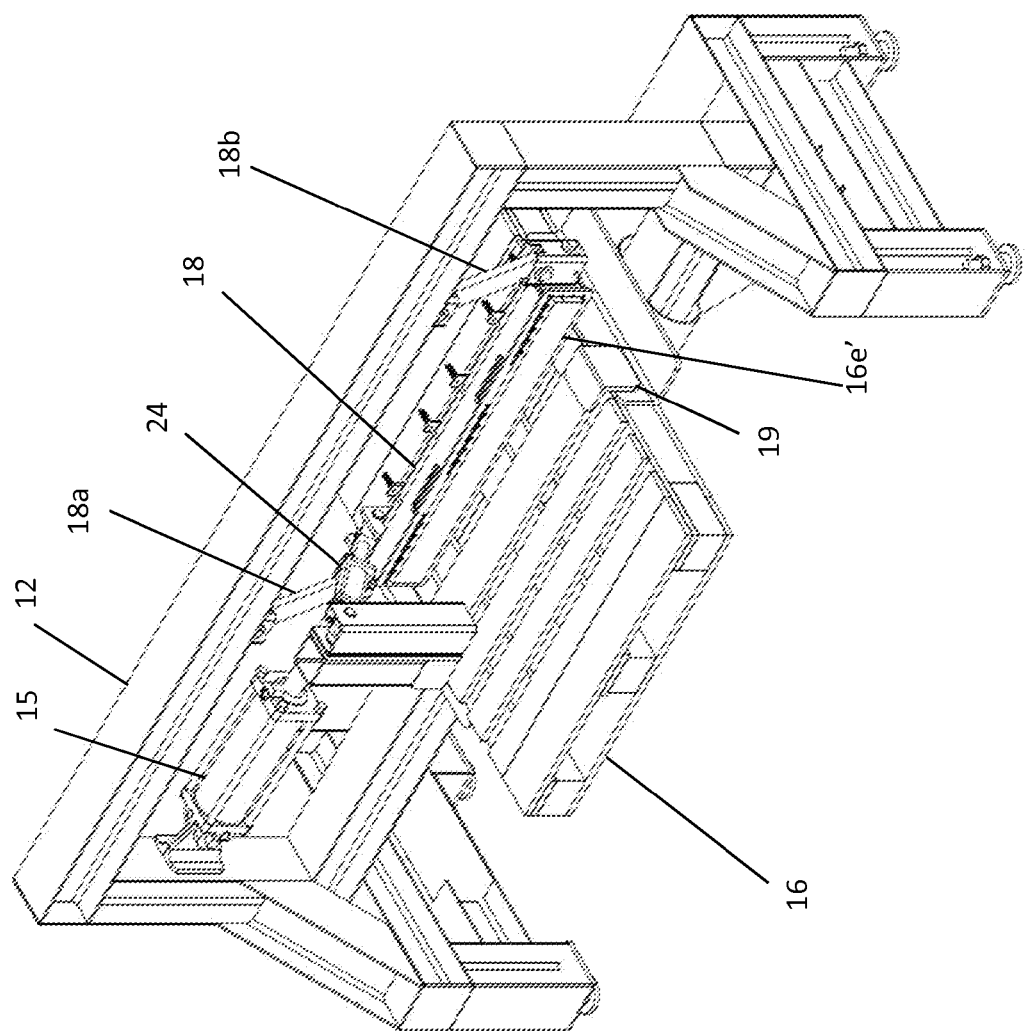
FIG. 6 is a perspective view of the ram support frame, with the ram in the third position after having engaged and removed a board from the pallet, the ram being rotated 90 degrees to orient the removed board toward the front of the apparatus.

Upon the pallet 16 coming into alignment with the spacers 28, that is, when the spacers 28 extend into the interior of the pallet shown as open areas 16a and 16b (see FIG. 2), the board removal process is then initiated whereupon the spacers 28 extend or expand laterally to press or bear against the inside of the middle layer 16c, specifically, the blocks, of pallet 16 to secure and stabilize pallet 16 and prevent its movement during the board removal process. After the spacers 28 finish their lateral expansion, spacer cams 30 lock or secure the spacers 28 in place (as will be discussed in greater detail below) in order to secure and stabilize the pallet 16. Pallet 16 can also be secured in position and prevented from moving when engaged by ram 18 by lateral bracket 19 as best shown in FIG. 6. While automated apparatus 10 removes a damaged top board 16e' from pallet 16, spacers 28 secure and stabilize boards 16d and 16e and blocks 16c adjacent to the top board 16e' being removed, thereby inhibiting adjacent boards from splitting or shifting. Lateral bracket 19 also inhibits pallet 16 from moving out of alignment with spacers 28 during the board removal process.

Figure 7A:
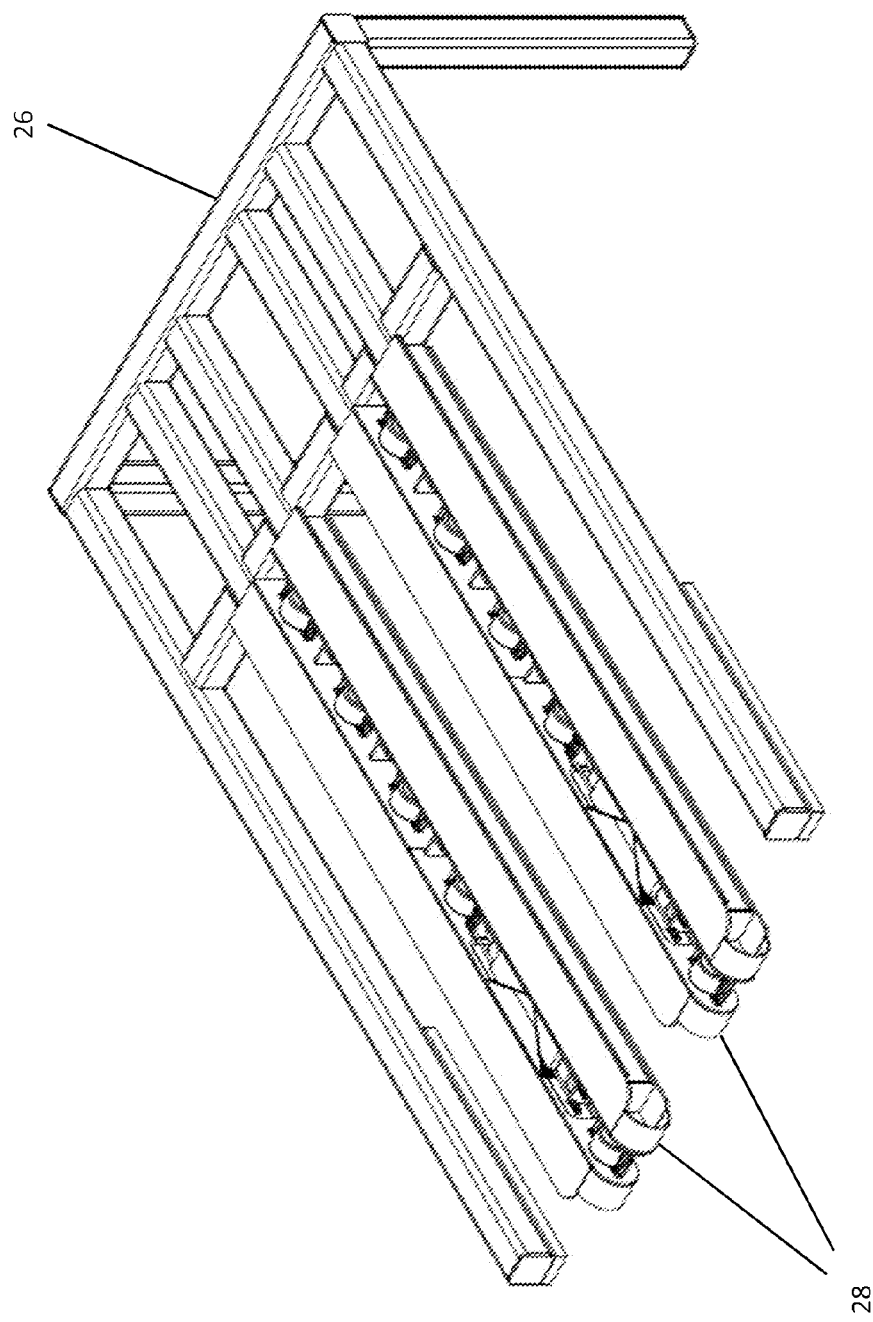
FIG. 7A is a perspective view showing the spacer support frame with spacers in an expanded state.
Figure 7B:
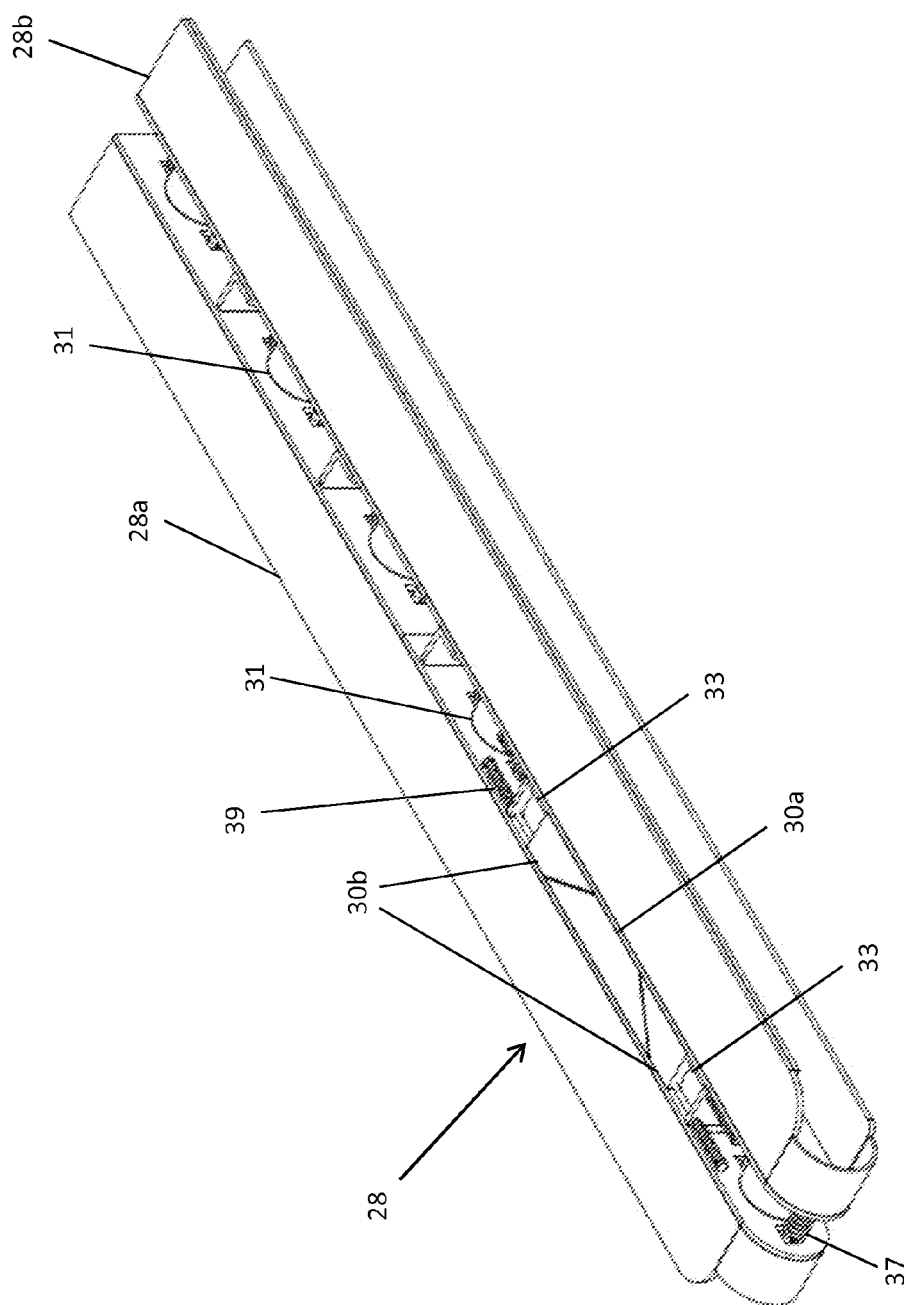
FIG. 7B is a perspective view showing the spacer in isolation, the spacer being in a retracted state.
Figure 7C:
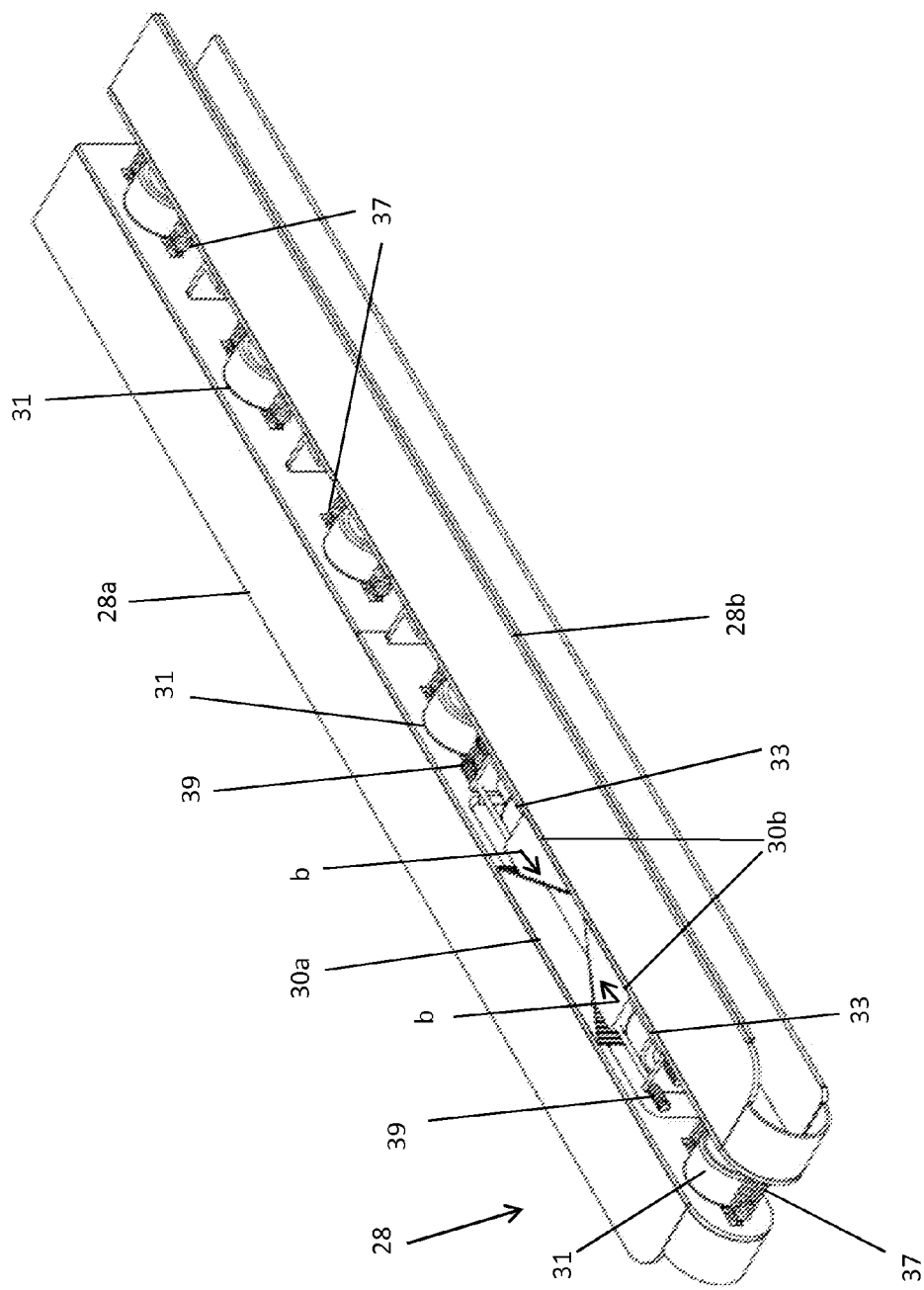
FIG. 7C is a perspective view showing the spacer in isolation, the spacer being in an expanded state.

As shown in FIGS. 7A-7C, each spacer 28 is supported by spacer support frame 26 and comprises one or more spacer cams 30, each comprising a fixed cam block 30a, one or more sliding cam blocks 30b, one or more expandable bladders 31, one or more expandable cam bladders 33, a series of tension springs 37 arranged adjacent the air bladders 31, and cam springs 39 coupled to each sliding cam block 30b. All of the aforementioned components are arranged between lateral rail members 28a and 28b. FIG. 7B depicts a single spacer 28 in a static or retracted state, while FIGS. 7A and 7C depicted the spacers in an expanded state. Once the retracted spacers are properly positioned within the open spaces 16a and 16b of the pallet 16 as noted above, spacers 28 are expanded to an expanded state as shown in FIGS. 7A and 7C by the following process: (1) air bladders 31 are inflated, pushing lateral rail members 28a and 28b apart; (2) substantially simultaneously cam air bladders 33 are inflated to drive the sliding cam blocks 30b toward each other as shown by the reference arrows "b" in FIG. 7C in order to form a cam- or wedge-type locking engagement against fixed cam block 30a, thereby locking the lateral members 28a and 28b in abutting engagement against the interior blocks or braces of the middle layer 16c of the pallet 16 to prevent its movement during the board removal process. Such a locking engagement of cam blocks 30a and 30b can be enhanced by providing a serrated surface to one of both of the cams blocks as shown in the figures to increase their frictional engagement.

The spacer 28 returns from its expanded state to its retracted state by deflation of the bladders 31 and cam air bladders 33. The tension springs 37 are biased to draw the rail members 28a and 28b together and the cam springs 39 are biased to draw the sliding cam blocks 30b away from the fixed cam block 30a. Once the opposing force of the inflated bladders 31 and 33 is removed, the springs 37 and 39 return the spacer to its retracted state.

Upon the control system detecting there is no further movement in the sliding cam blocks 30b, thereby indicating the spacer is displaced at its maximum point of expansion and is locked or fully engaged with the pallet, the control system then activates the ram 18 to initiate the board removal process. Upon activation, ram 18 moves from its first or ready position shown in FIGS. 1A, 2, 3, and 5, and begins a forward stroke or movement to engage a pre-selected pallet board 16e' with the board removal assembly 20 carried by ram 18.

Board removal assembly 20 preferably includes a push plate 21 (see FIGS. 9 and 10), air bags or bladders 23, and a plurality of spikes 22 shown here as fixed on one or more spike plates (see FIGS. 11A-C and 12). Optionally, a rake 34, shown here as fixed on one or more rake plates, can also be employed as shown in FIGS. 11A-C and 13 to be carried upon assembly 20. The spikes comprise a plurality of angled teeth or spikes configured to removably engage a single slat or board 16e' of the pallet as described herein during a first stroke of the ram 18. Referring again to FIGS. 9 and 10, the spikes 22 extend through slots 27 in the push plate 21. The air bags 23 are configured to fit between the push plate 21 and the ram 18, on the same side of the ram as the spikes 22. Inflation of the air bags 23 forces the push plate 21 outward and away from the ram 18, effectively retracting the spikes 22 through the slots 27 provided in the push plate 21. Springs 25 are attached to the push plate 21 and are biased to return the push plate 21 to its original state upon deflation of the air bags 23.

After the ram 18 has completed its forward stroke to a point of maximum displacement, ram 18 can be rotated by cylinder 24 (see FIG. 8) to position the optional rake plates 34 facing downwardly, in the direction of the pallet, whereupon the rakes 34 then pass back over the pallet surface to remove any remaining fasteners (nails, staples, etc.) during the ram's reverse return stroke to its first ready or home position.

Ram 18 is configured to translate from a first or ready position as shown in FIGS. 1A, 2, 3, and 5 laterally (and slightly downwardly in an arc-like path due to the pendulum-like pivoting action of ram pivot arms 18a and 18b) to a second, board-engaging position to engage the slat or board 16e' with the assembly 20. After the completion of the forward stroke by ram 18 (see FIG. 6), ram 18 is rotated 90 degrees by rotation means 24, in this embodiment, a pneumatic or hydraulic cylinder configured to rotate the ram 18, so that the spike plates 22 and the board push plate 21 are facing towards the front of the apparatus 10, as shown in FIG. 6. Board push plate 21 is then activated by air being introduced into airbags 23 carried by assembly 20 to eject the damaged board from the assembly 20. Before the rotating ram 18 begins to reverse its original path, sensors facing towards the board push plate confirm that the damaged board is in fact ejected cleanly from the assembly 20 and generate a signal to the control system that the ram 18 can proceed in a reverse path.

Figure 14:
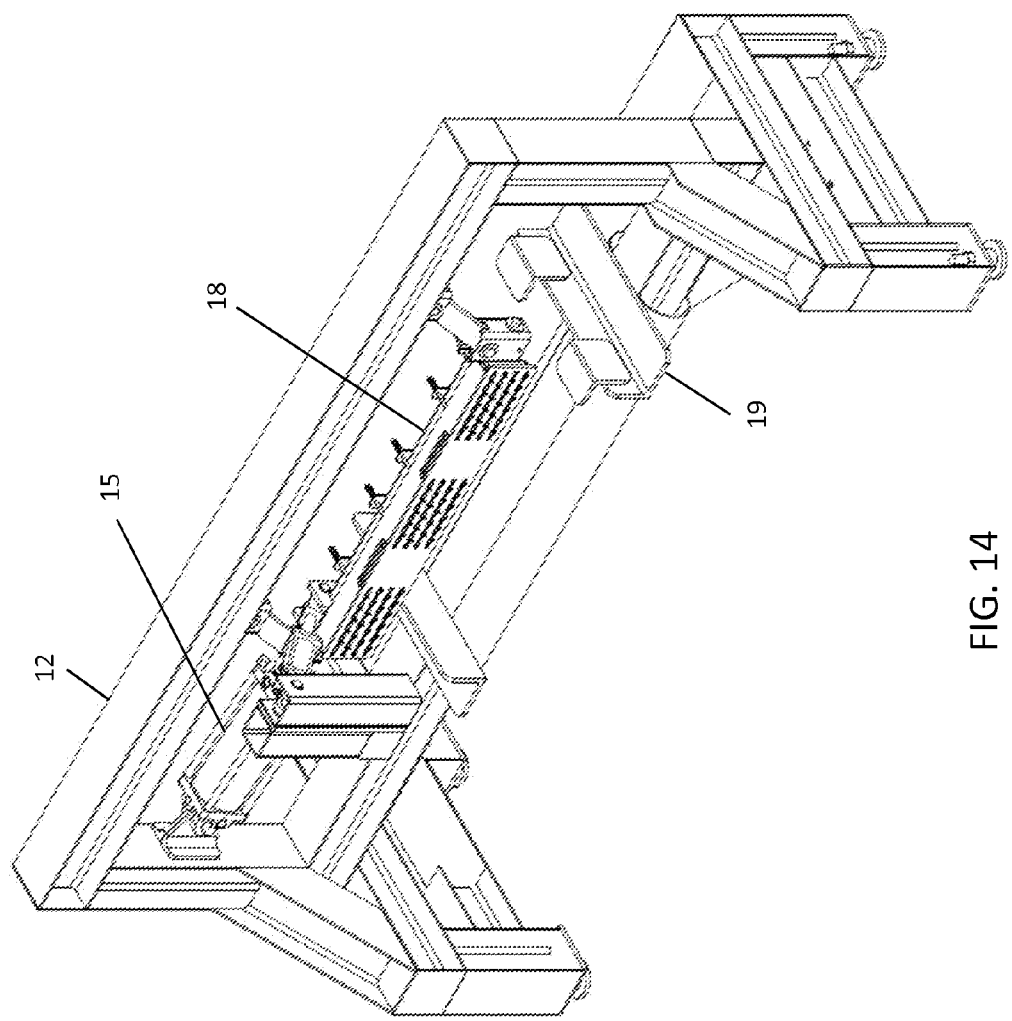
FIG. 14 is a perspective view of the ram support frame, the ram having returned back to the first position after the optional rake plates have passed across the surface of the pallet (not shown).

During the reverse stroke of ram 18, optional rake plates 34 carried by assembly 20 can scrape across the open surface of the pallet where the removed board had been located in order to remove any free standing fasteners, such as nails or screws. When the ram 18 return stroke has been completed, as shown in FIG. 14, the cylinder 24 will then reverse the 90-degree rotation that it previously performed at the end of the ram's forward stroke, which will reset the ram 18 back into its first or ready home position with spike plates 22 facing downwardly.

Figure 16:
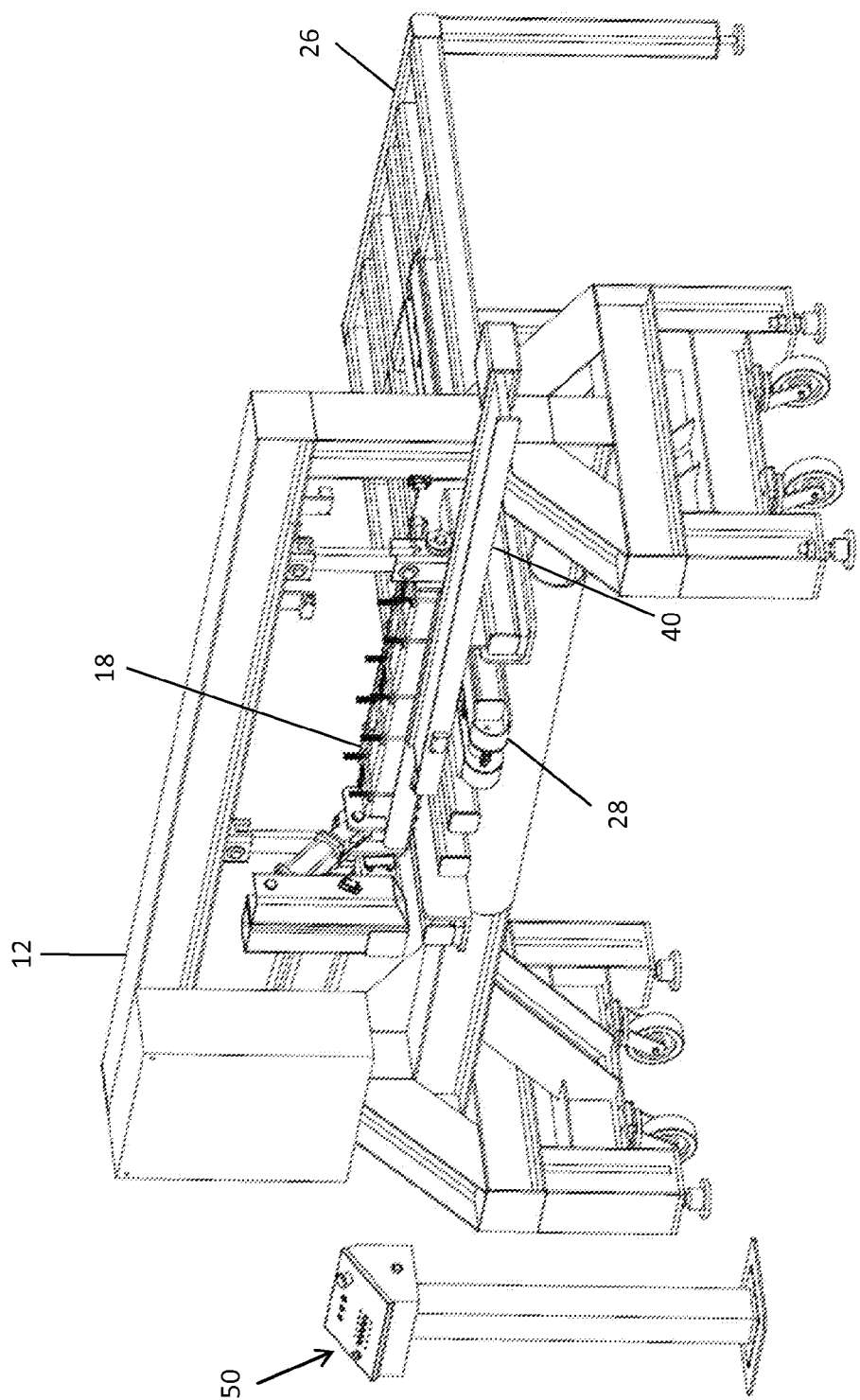
FIG. 16 is a perspective view of the first embodiment of the apparatus shown in combination with a conveyor belt and a control system.

In operation, once the board 16e' is engaged, the ram 18 is configured to be driven by drive cylinder 15 from the second board-engaging position shown in FIG. 16 (where ram supporting arms 18a and 18b are substantially vertical) to a third removal position shown in FIG. 6, wherein ram 18 has moved further laterally away from its home or ready position but also slightly upwardly as shown due to the pendulum—like pivoting action of ram supporting arms 18a and 18b, in order to completely remove and separate the board 16e' from the pallet 16 by spike plates 22 physically puncturing and engaging the board 16e' and then disengaging the board 16e' from the pallet by a mechanical shearing or pulling action acting on the board 16e', which is now firmly secured or affixed to spike plates 22, caused by the lateral and upward movement of ram 18 away from the pallet 16.

Once the ram 18 has removed and separated the board from the pallet, the ram 18 is rotated 90 degrees by the rotation cylinder 24 to a vertical position as shown in FIG. 6. At that point the removed board is disengaged or ejected from the assembly 20 of ram 18 by the inflation of airbags 23, which acts to push the push plate 21 outwardly, which in turn pushes and ejects the board from the spikes 22 that extend through the push plate 21. In some embodiments, the ejected board then drops onto a conveyor belt 40, as shown in FIG. 16, to be carried away from the apparatus.

Figure 15B:
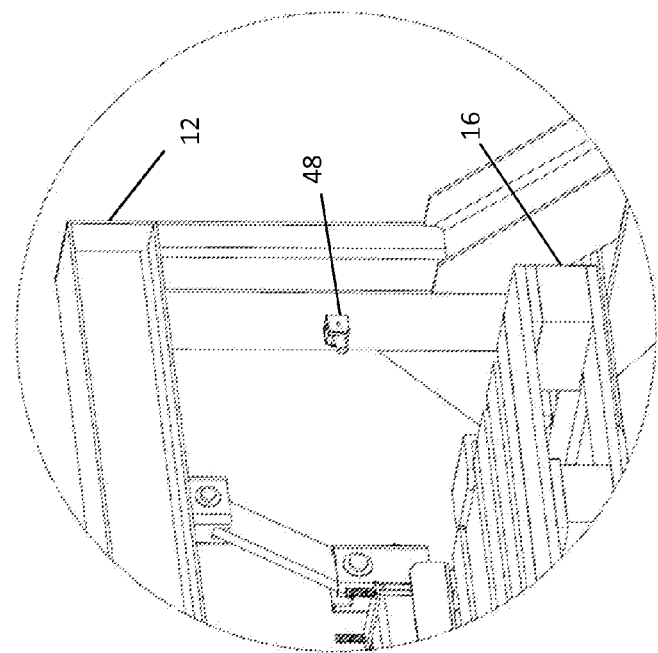
FIGS. 15A and 15B are perspective views of the first embodiment including a laser positioning means, FIG. 15B being an enlarged view of the apparatus shown in FIG. 15A.
Figure 15A:
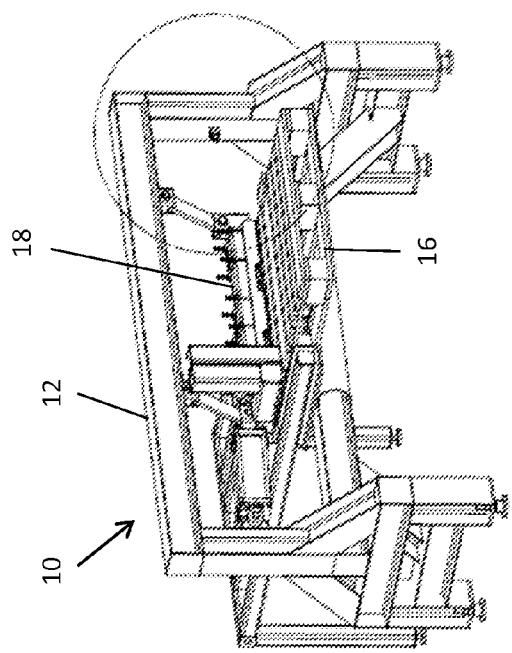

In some embodiments, a laser 48 is mounted to the frame 12 as shown in FIGS. 15A and 15B. The laser 48 is configured to identify when the pallet and the selected board to be removed is located in the proper position, at which point the board removal process is initiated and the pallet is secured by spacers 28 and bracket 19, and ram 18 is activated by the control system to initiate the board removal process. In some embodiments, the laser 48 emits a visible beam aligned with the direction of travel of the ram 18, and an operator positions the pallet 16 onto the spacers 28 such that the beam generally falls on the midline of the board 16e' to be removed.

In some embodiments, the apparatus 10 includes a sensor for detecting when the ram has completed a forward or a reverse stroke. For example, contact sensors may be positioned on the frame 12 such that the ram 18 contacts the sensors when disposed in the first and third positions. Activation of the contact sensors indicates to the control system that no further extension or retraction of the drive cylinder 15 is necessary.

Figure 17A:
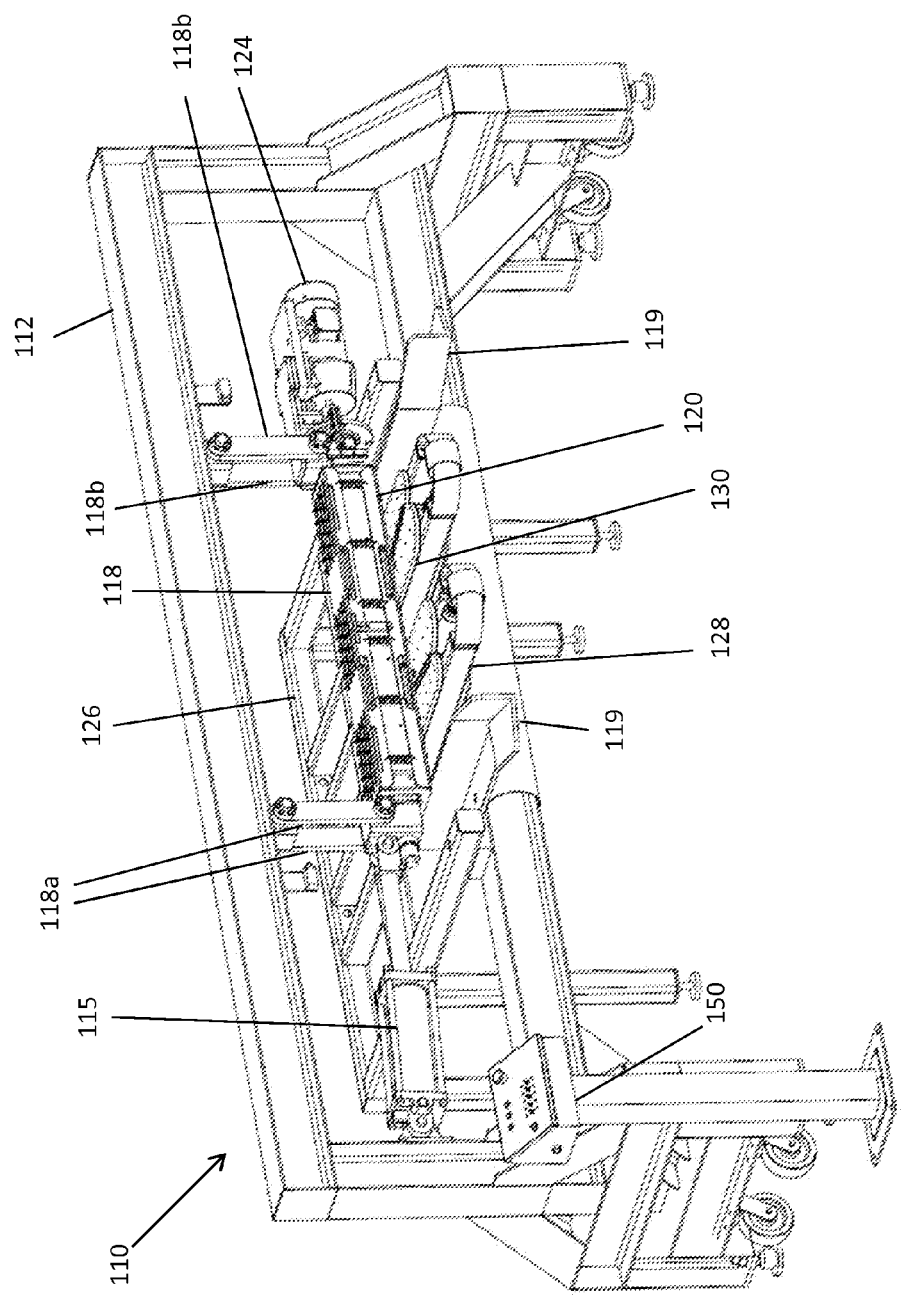
FIG. 17A is a front perspective view of a second embodiment of the apparatus.
Figure 17B:
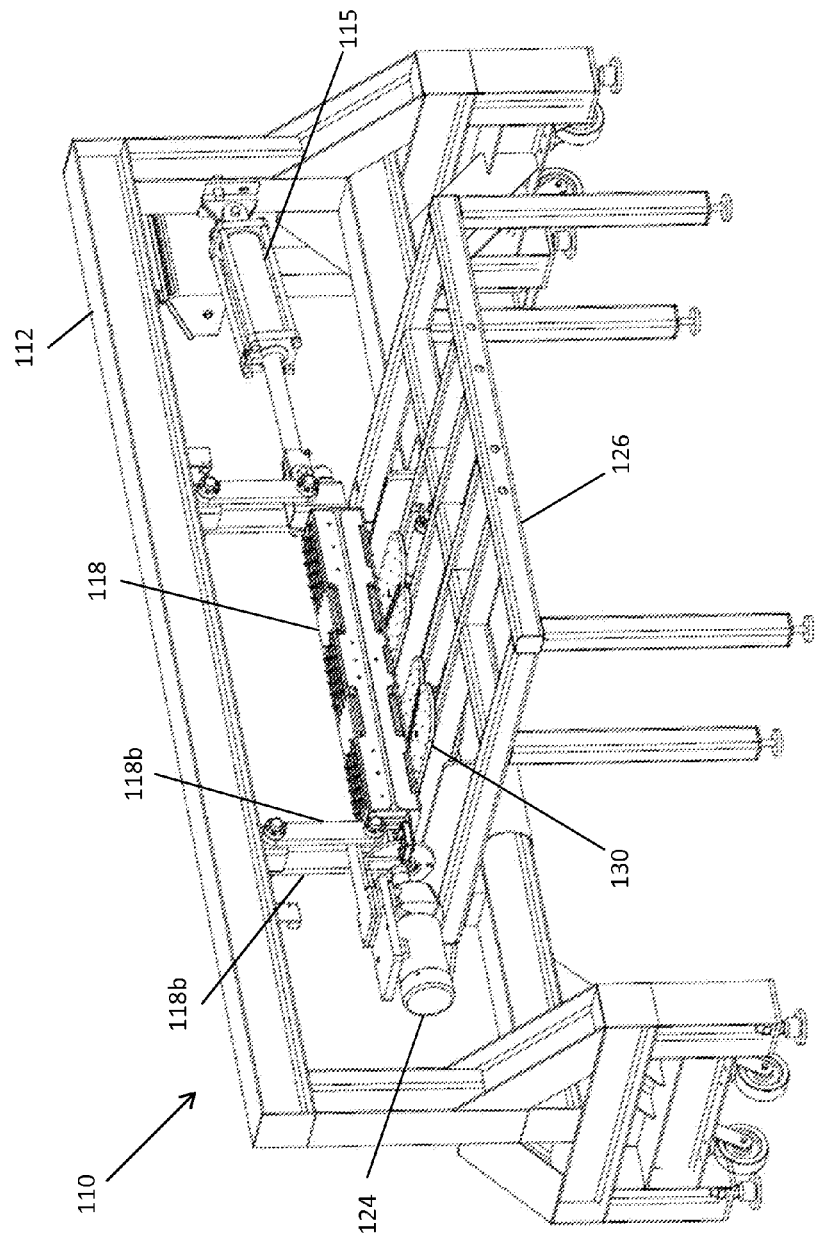
FIG. 17B is a rear perspective view of the second embodiment.
Figure 17C:
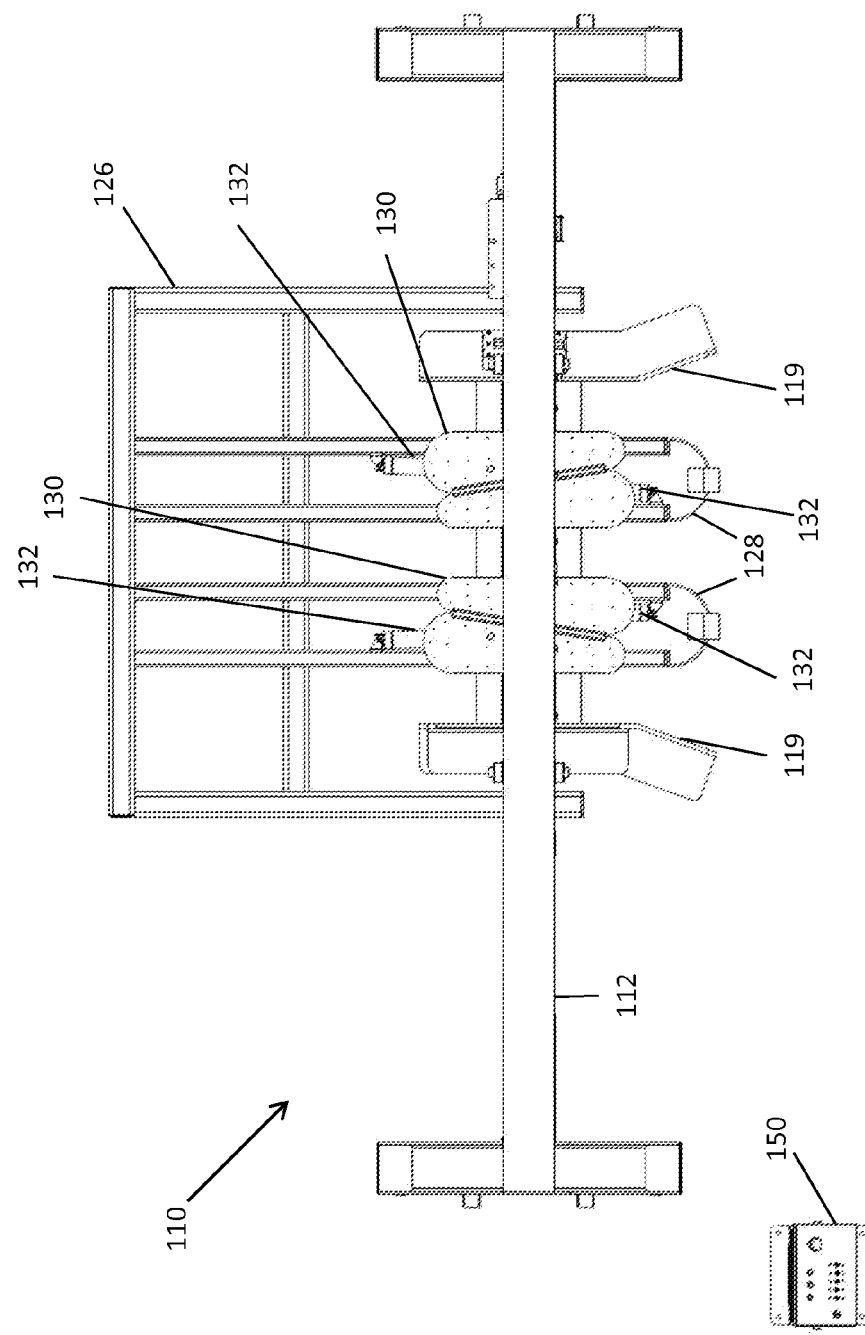
FIG. 17C is a top plan view of the second embodiment.

A second embodiment of an automated apparatus 110 for refurbishing or recycling a pallet 16 is shown and described hereinafter in connection with FIGS. 17-29. More particularly, FIGS. 17A, 17B, and 17C show left front perspective, left rear perspective, and top plan views, respectively, of the apparatus 110. Apparatus 110 includes a support frame 112 intended to be arranged closely adjacent with a conveyor (not shown in FIG. 17 for clarity) in a fashion substantially similar to apparatus 10 shown and described in connection with FIGS. 1-16 above. Apparatus 110 further comprises a bi-directional rotating ram 118 mounted on frame 112 and a spacer support frame 126. Ram 118 is rotatingly driven by a motor 124, and is laterally driven to and fro by drive cylinder 115 coupled to frame 112. Drive cylinder 115 can be pneumatic or hydraulic. Motor 124 is optionally an electric motor. Spacer support frame 126 supports one or more spacer means 128.

As discussed above in connection with FIGS. 1-16, in operation a conveyor is preferably configured for moving the pallet to be worked upon into position by feeding the pallet onto the spacers 128 for proper alignment for the purpose of removing a damaged board or slat from the pallet. Upon the pallet coming into alignment with the spacers 128, whereupon the spacers extend into the interior of the pallet (open areas 16a and 16b in FIG. 1B), the spacers 128 extend or expand laterally to press or bear against the inside portions of the pallet in order to secure and prevent movement of the pallet during the board removal process.

Figure 19:
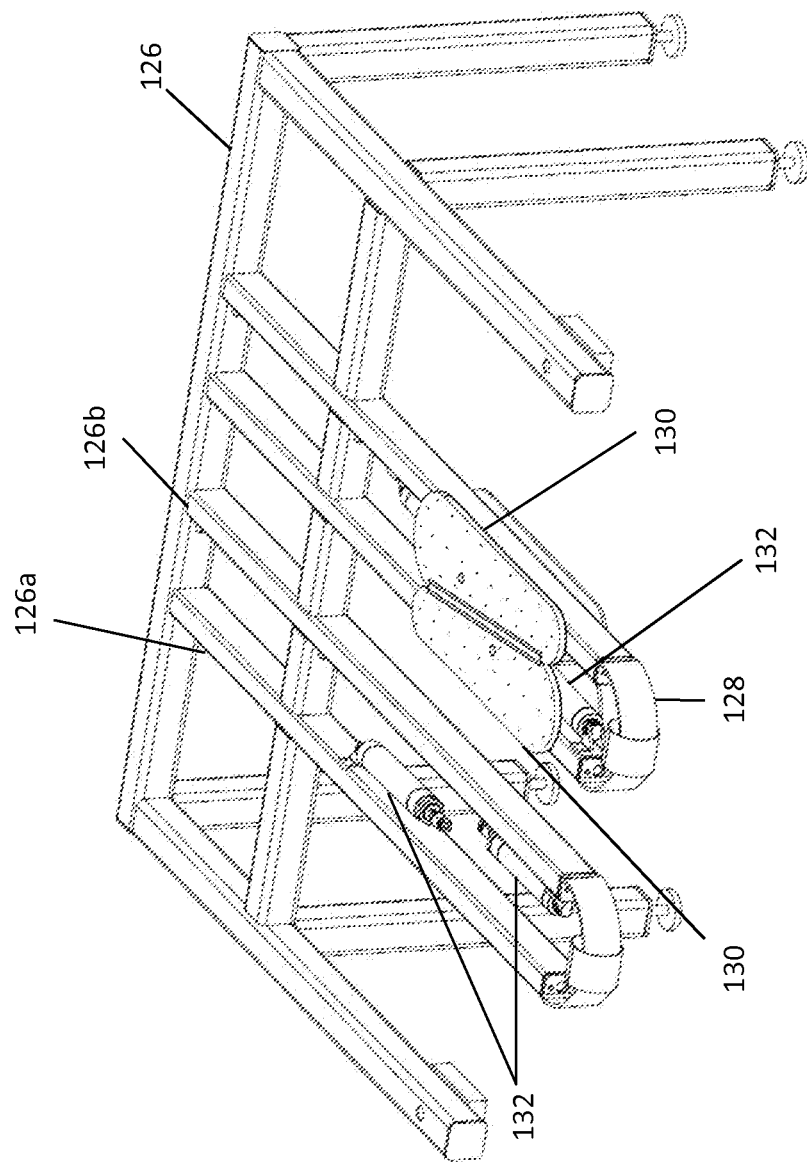
FIG. 19 is a perspective view of the spacer support frame with the pads removed from one spacer to show the spacer cylinders.

Each spacer 128 may include a pair of cam-shaped pads or blocks 130a, 130b, each of which is coupled to a respective spacer cylinder 132a, 132b for moving each pad 130 to and fro. Cylinders 132a, 132b may be pneumatic or hydraulic cylinders. In a first home or steady position as shown in FIGS. 18, 19, 20A and 27, pads 130a, 130b are retracted and arranged immediately side-by-side to define a narrow retracted state for spacer means 128 in order to receive the pallet. For illustration purposes, FIG. 19 shows a pair of spacer means 128 with one pair including pads 130a, 130b and the other such pair not including pads 130 in order to readily depict the manner in which each cylinder 132 is connected to a respective pad 130 on one end and to the support frame 126 at its opposite end. All of the aforementioned components are arranged and supported upon lateral rail members 126a and 126b of support frame 126.

Figure 20A:
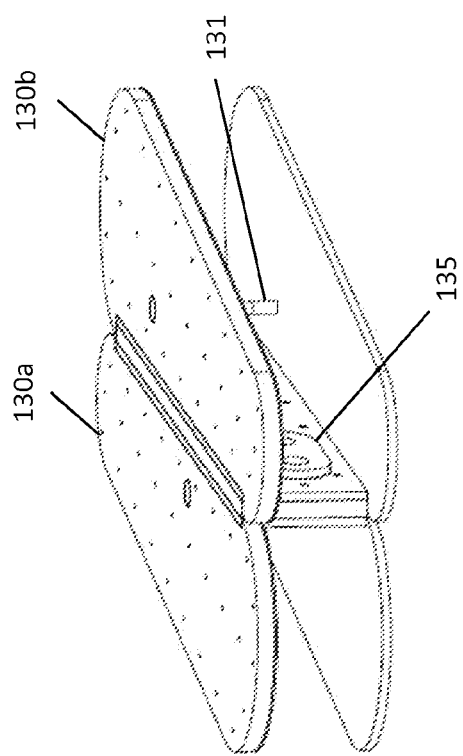
FIGS. 20A and 20B are perspective views of the pads of the spacer means of the second embodiment shown in isolation.
Figure 20B:
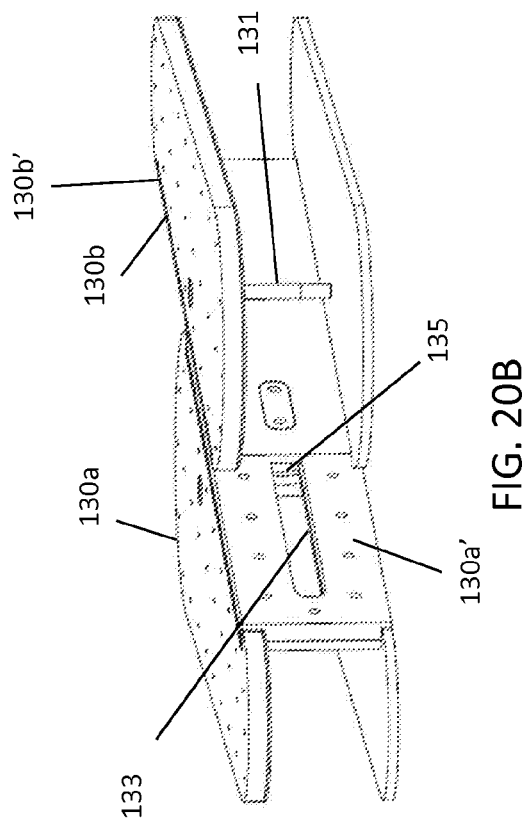
Figure 21:
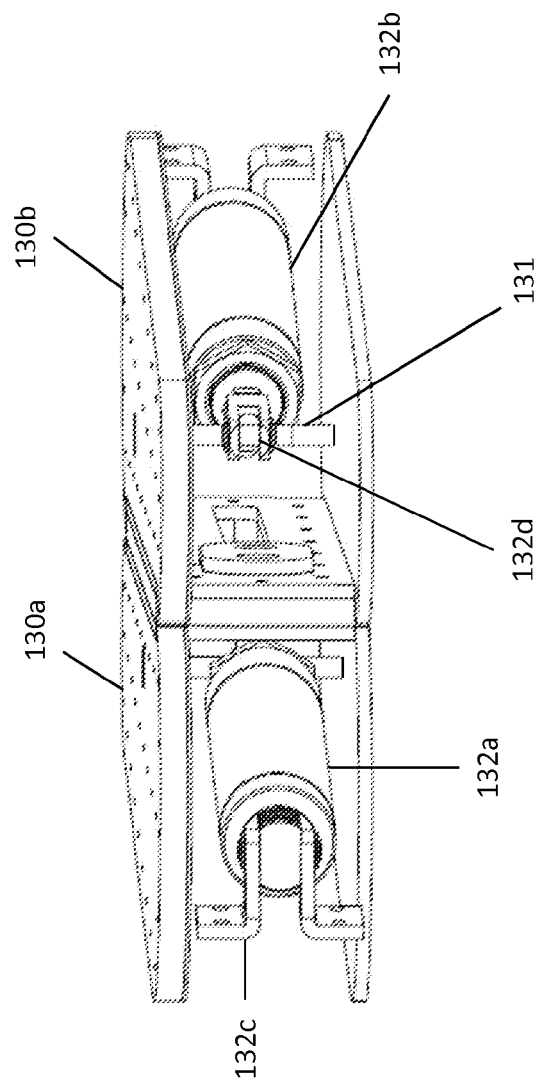
FIG. 21 is a perspective view of the pads of the spacer means of this embodiment shown in combination with their respective drive cylinders in a retracted state.

More particularly, FIG. 21 shows in isolation a pair of pads 130a, 130b in a retracted state coupled to their respective spacer cylinders 132a, 132b. Each cylinder 132 may be attached at its first end 132c to either rail member 126a or 126b of support frame 126 (as shown in FIG. 18) and at its second (opposing) end 132d to anchor post 131 of a pad 130. Each pad 130a, 130b has at least one angled lateral side 130a', 130b' (as best shown in FIG. 20B), such that when each pad is in proper position and connected to its respective spacer cylinder 132, the angled lateral sides 130a', 130b' face each other in an opposing manner. In operation, referring now to FIG. 22, when pad 130a is driven in the direction of reference arrow a in FIG. 22 and pad 130b is driven in the opposite direction of reference arrow b in FIG. 22 by their respective cylinders 132a, 132b, the angled sides 130a' and 130b' slidingly engage and bear against each other and, due to their angled shape, act in a camming fashion to push outwardly the wider end of each pad 130a, 130b in the direction of reference arrows a' and b', respectively. This slight swing-out action of the wide end of each pad causes the pads to increasingly engage the interior portions of the pallet to releasably secure the pallet in position.

As shown in FIGS. 20A, 20B, 21, and 23, in order to keep each pad 130a in proper sliding alignment with each opposing pad 130b, one pad is provided with a slot 133 in its angled lateral side 130a', 130b' and the opposing pad is equipped with a side post-and-tab 135 that extends from its angled lateral side through slot 133 and travels to and fro within slot 133.

Figure 22:
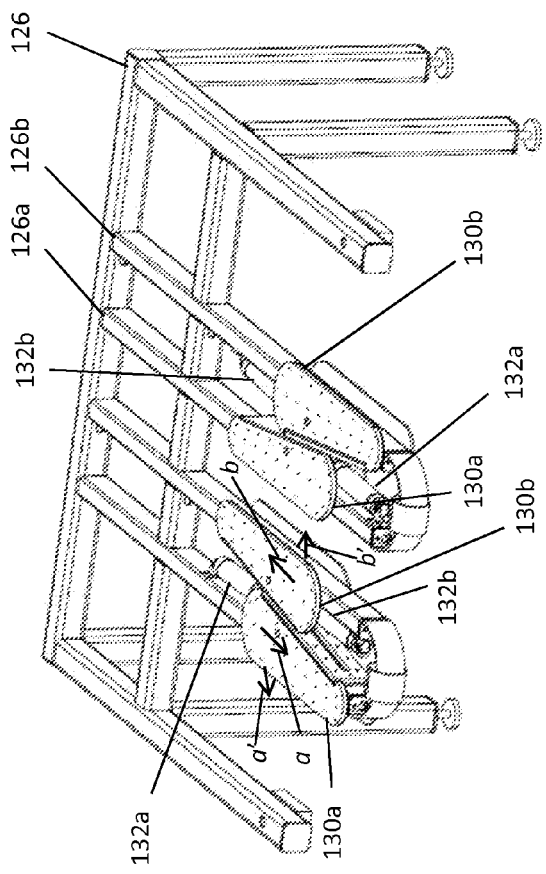
FIG. 22 is a perspective view of the spacer support frame of this embodiment with the spacers in an expanded or extended state.
Figure 23:
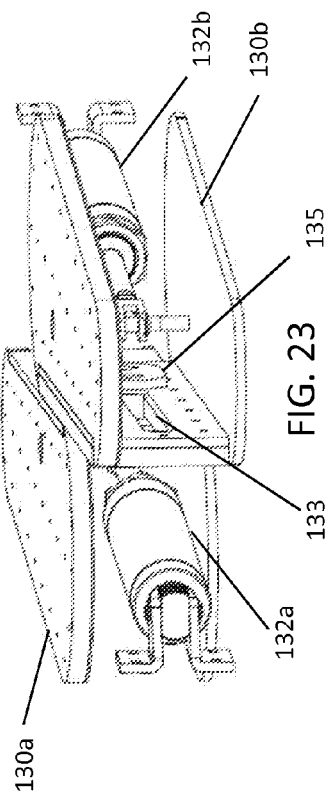
FIG. 23 is a perspective view of the pads of the spacer means of this embodiment shown in isolation in combination with their respective drive cylinders in an expanded state.
Figure 24:
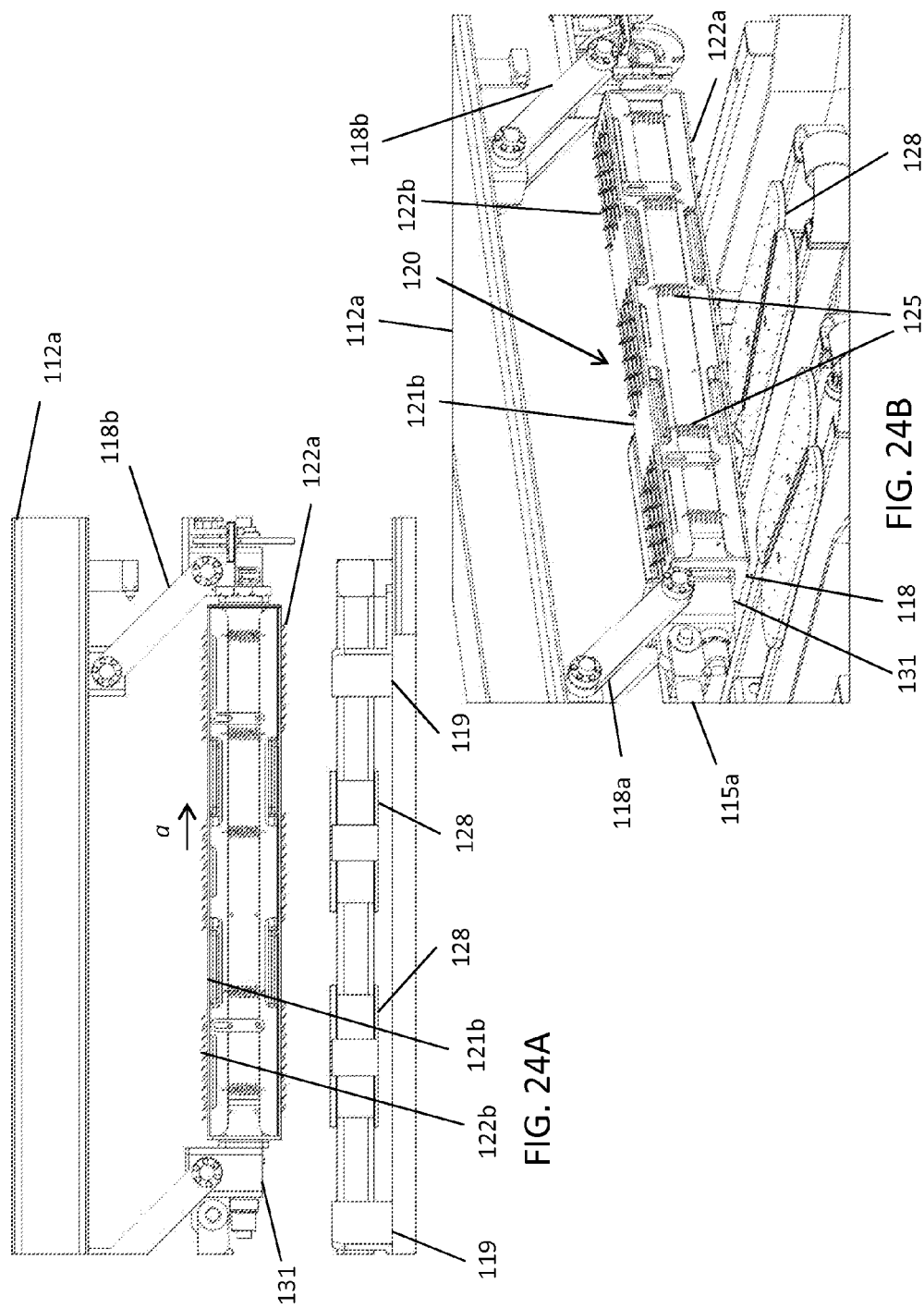
FIGS. 24A and 24B are partial front elevation and front perspective views, respectively, of the second embodiment showing the ram that supports and carries the board-removal assembly, wherein the ram is in the fully extended third position during a forward stroke.

Once the pallet has been properly positioned within apparatus 110, cylinders 132 are activated by the control system to drive pads 130a, 130b in opposing directions, as shown in FIGS. 20B, 22 and 23, in order to widen spacers 128 to engage, secure and stabilize the pallet within apparatus 110. The pallet can further be secured in position and prevented from moving when engaged by ram 118 by lateral brackets 119 as shown best in FIG. 17A. Lateral brackets 119 also inhibit the pallet 16 from moving out of alignment with spacers 128 during operation. Once spacers 128 secure the pallet in position, the control system then activates the ram 118 and board removal assembly 120 to initiate the board removal process.

For purposes of the following discussion, reference may at times be made to the mode of operation of apparatus 10 as described above in connection with FIGS. 1-16 as the mode of operation of apparatus 110 is similar. It will be pointed out throughout the discussion, however, where the operation or structure of apparatus 110 differs from that of apparatus 10.

Figure 29:
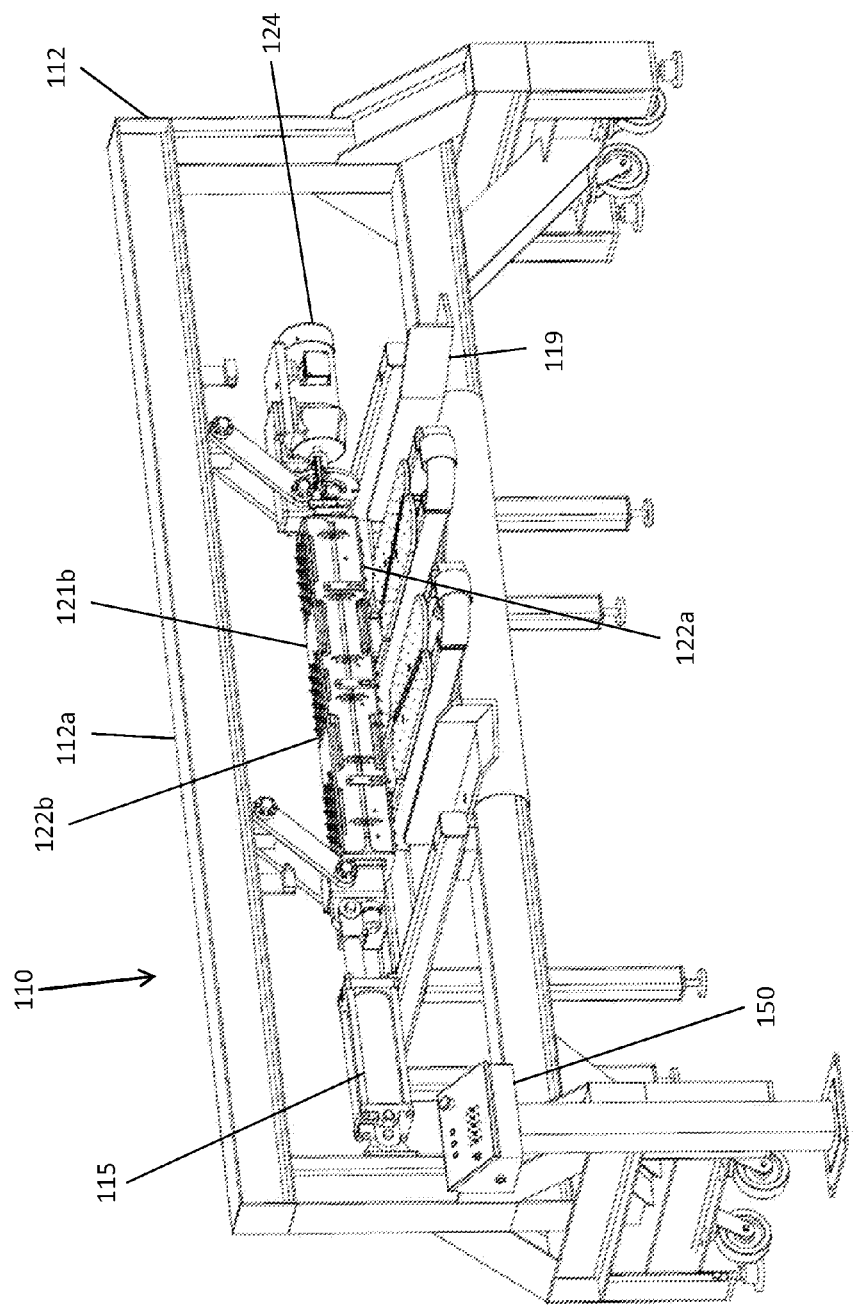
FIG. 29 is a perspective view of the second embodiment of the invention showing the ram assembly in the first position.

Once the pallet is secured in position, the ram 118 is activated by the control system to move from a first or ready position, as shown in FIG. 29, and begin a forward stroke or movement to engage a pre-selected board on the pallet via board removal assembly 120 carried by ram 118. The primary differences between assembly 20 discussed above and 120 discussed herein is that assembly 120 does not include rake plates 34, and that assembly 120 is equipped with spike plates 122 on opposing first and second sides of the assembly whereas assembly 20 has spike plates 22 on only a first side and a rake 34 on a second side perpendicular to the first side. Because it carries spike plates 122 on opposing sides, assembly 120 further carries a second push plate and air bladders disposed on that opposing side of assembly 120 as well in order to eject the removed board from that side of the assembly as needed. More particularly, board removal assembly 120 can include a pair of push plates 121a and 121b, air bladders or bags 123a and 123b, and spike plates 122a and 122b carried on opposing sides of assembly 120.

Figures 26A, 26B:
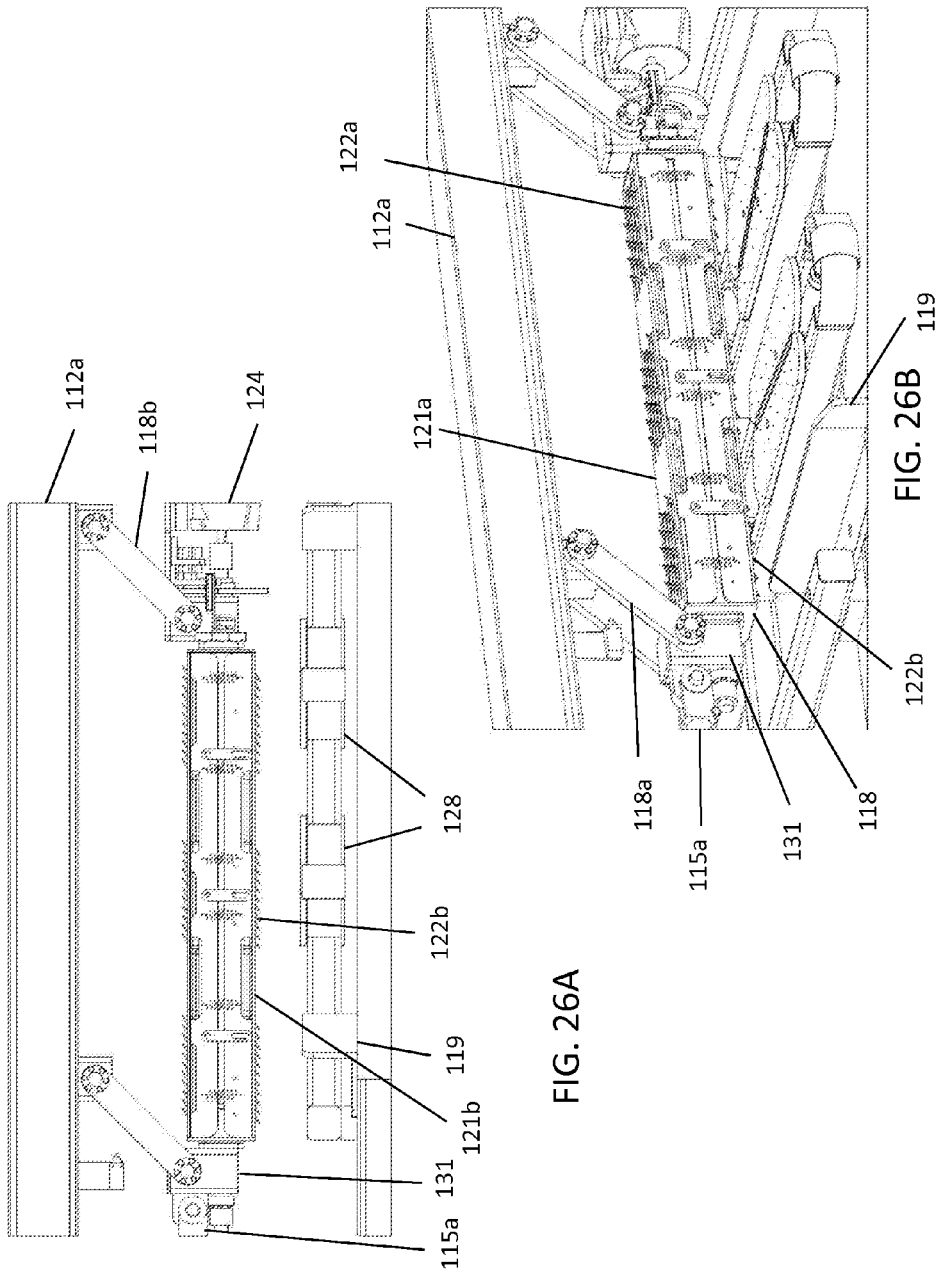
FIGS. 26A and 26B are partial front elevation and front left perspective views, respectively, of the invention showing the ram that supports and carries the board-removal assembly, wherein the board-removal assembly is in a fully retracted position after a reverse stroke.

The spike plates 122 carried by assembly 120 are configured to removably engage a single slat or board of the pallet as described herein during a first forward stroke of the ram 118. One may discern that the ram 118 has just finished its forward stroke in the direction of reference arrow a in FIG. 24A by the direction in which the angled teeth or spikes of the lower spike plates 122a are facing. More specifically, if the spikes are angled or pointing in the right direction, such as they are in FIGS. 24A and 24B, then the ram is poised to move, is moving, or has moved to the right in a forward stroke. Conversely, if the angled spikes of the lower spike plates nearest the pallet are pointing to the left, then ram 118 is poised to move, is moving, or has moved in its second reverse stroke returning to its ready first position (as shown in FIGS. 26A and 26B). While automated apparatus 110 removes a damaged top board from the pallet, spacers 128 secure and stabilize boards 16d and 16e and blocks 16c (see FIG. 1B) adjacent to the top board 16e' being removed, thereby inhibiting the pallet's adjacent boards from splitting or shifting.

Figure 25:
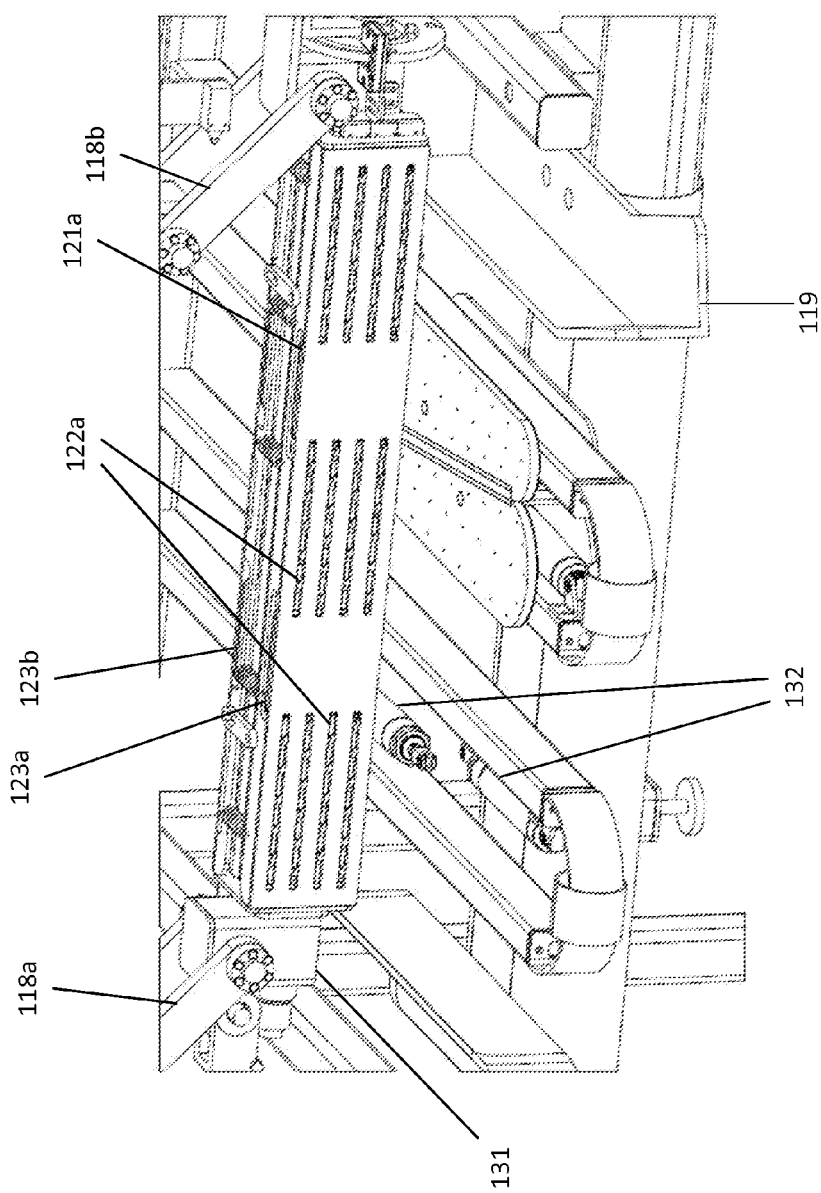
FIG. 25 is a partial front perspective view of the second embodiment showing the board-removal assembly in the third position during a forward stroke with the spikes facing the front of the assembly. Pads are removed from one spacer to show the spacer cylinders.

As shown in FIGS. 24A and 24B, after ram 118 and assembly 120 have completed a forward stroke to a point of maximum displacement, ram 118 and assembly 120 are positioned at a point of maximum distance away from cylinder 115 carrying abuttingly against its lower side a removed pallet board (not shown in FIG. 24A, 24B, or 25 for clarity). At this point ram 118 an assembly 120 can be rotated 90 degrees by motor 124 as shown in FIG. 25 to position the damaged board forward-facing in order for the removed board to be ejected from the ram 118 in the same manner as described in connection with ram 18 and FIGS. 1-16 above, that is, air bladders 123a carried within assembly 120 are pressurized, which in turn push or urge push plate 121a outwardly. Plate 121a in turn urges the pallet board outwardly as well, thereby increasingly dislodging and disconnecting the board from the teeth of the spike plates 122a. Optionally, the removed board may thereafter be dropped onto a conveyor, such as conveyor 40 shown in FIG. 16, in order to be carried away from apparatus 110.

Once the removed board is ejected from the ram 118, the ram may be rotated another 90 degrees so that the opposite-facing spike plates 122b are now facing downwardly and spike plates 122a are now facing upwardly, each set of plates now being oriented 180 degrees from their previous position during the first forward stroke. In this instance, the teeth of the lower spike plates 122b are now pointing to the left in FIGS. 26A and 26B. The ram 118 is then activated to proceed in a reverse return stroke to engage and remove another board from the same or another pallet as it returns to its first ready or home position as shown in FIG. 29.

Figure 27:
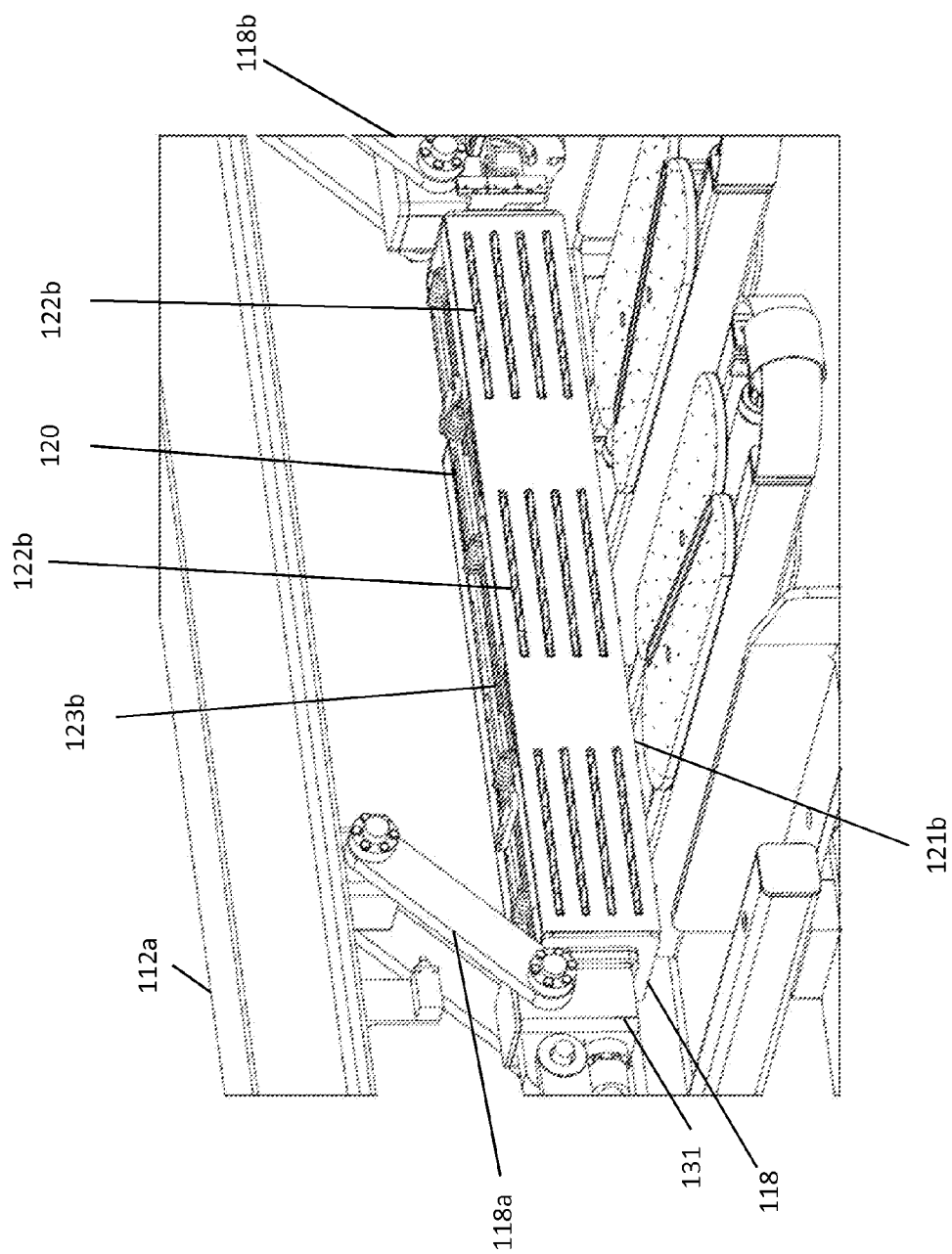
FIG. 27 is a partial front perspective view of the second embodiment showing the ram that supports and carries the board-removal assembly, wherein the board-removal assembly is in a fully retracted position during a return stroke with the ram assembly disposed in the vertical position after having engaged and removed a damaged board from the pallet and thereafter rotated 90 degrees to vertical.

Referring now to FIGS. 26A and 26B, after ram 118 and assembly 120 have completed a return stroke by the retraction of cylinder 115 to a point of minimum displacement, ram 118 and assembly 120 are positioned at a point closest to cylinder 115 carrying abuttingly against its lower side a removed pallet board (not shown in FIG. 26A or 26B for clarity). At this point ram 118 an assembly 120 can again be rotated 90 degrees, as shown in FIG. 27, by motor 124 to position the damaged board forward-facing (see FIG. 14A for example) in order for the removed board to be ejected from the ram 118 in the same manner as described above, that is, air bladders 123b carried within assembly 120 are pressurized, which in turn push or urge push plate 121b outwardly. Plate 122b in turn urges the pallet board outwardly as well, thereby increasingly dislodging and disconnecting the board from the teeth of the spike plates 122b. Again, the removed board may thereafter optionally be dropped onto a conveyor, such as conveyor belt 40 shown in FIG. 16, in order to be carried away from apparatus 110.

Once the removed board is ejected from the ram 118, the ram may be rotated another 90 degrees (or alternatively 270 degrees in the opposite direction in order to avoid tangling or causing undue stress on any pneumatic or hydraulic line(s) that lead to any drive cylinder or air bladder) so that the opposite-facing spike plates 122a are again facing downwardly and spike plates 122b are again facing upwardly, each set of spike plates oriented 180 degrees from their previous position during the second return stroke. In this instance, the teeth of the lower spike plates 122a are be pointing to the right as shown in FIGS. 24A and 24B. The ram 118 can then activated to proceed in another forward stroke to engage and remove another board from the same or another pallet in the same manner as described above.

As noted above with respect to ram 18, ram 118 is configured to translate from a first or start position to a second board-engaging position in the direction laterally (and slightly downwardly along an arc-like path due to the pendulum-like pivoting action of ram pivot arms 118a and 118b) as shown in FIG. 17A in order to engage the pallet slat or board to be removed with the removal assembly 120. Once the pallet board is engaged, the ram 118 is configured to be driven by drive cylinder 115 from the second board-engaging position, where ram pivot arms 118a and 118b are substantially vertical, to a third, fully extended position shown in FIGS. 24A and 24B, wherein the ram 118 has moved further laterally away from its ready position but also slightly upwardly as shown due to the pendulum—like pivoting action of ram support arms 118a and 118b. The assembly 120 moves back-and-forth in a generally pendulum fashion, defining an arc, in order to remove and separate the board from the pallet by the spike plates 122 physically puncturing and engaging the pallet board being removed.

As noted above, the pallet board is disengaged from the pallet by a mechanical shearing or pulling action acting on the board, which is now secured or affixed to the spike plates 122 carried by assembly 120, caused by the lateral and upward movement of the ram 118.

Before the ram 118 begins to reverse its path in either a return stroke or another forward stroke, sensors facing towards the board push plate 121 will observe whether the removed boarded has in fact been ejected from the removal assembly 120, and then indicate to the control system that ram 118 can proceed. By effecting the removal of a board in each of its forward and reverse strokes, as compared to the embodiment of apparatus 10 shown and described in connection with FIGS. 1-16 above, which removes a board only during the forward stroke of ram 18 of apparatus 10, the cycle time of apparatus 110 is generally shorter than that of apparatus 10.

Figure 8:
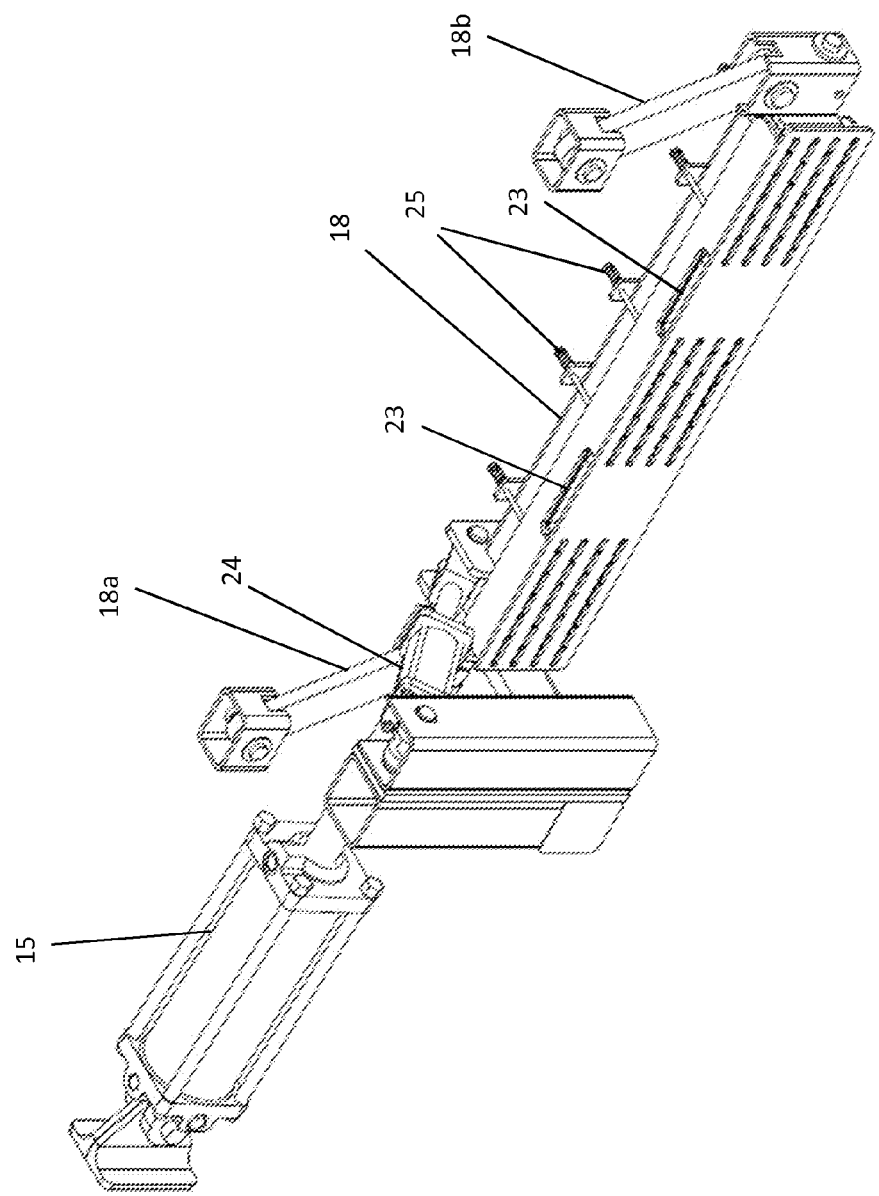
FIG. 8 is an enlarged isolated perspective view of the ram, actuating cylinders, and ram pivot arms of the invention as shown in FIG. 6, with the board omitted.
Figure 9:
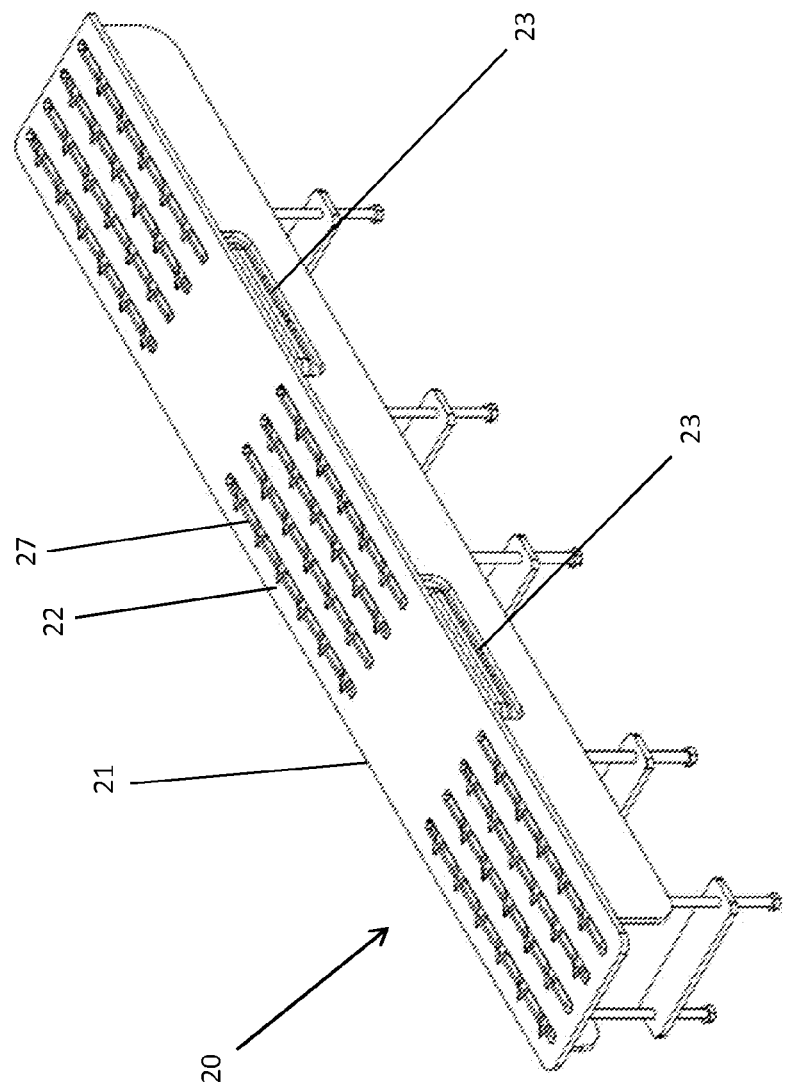
FIG. 9 is an enlarged isolated perspective view of the board-removal assembly carried by the ram of the invention, showing the manner in which the tips of the spikes extend through slots provided in the board push plate.
Figure 10:
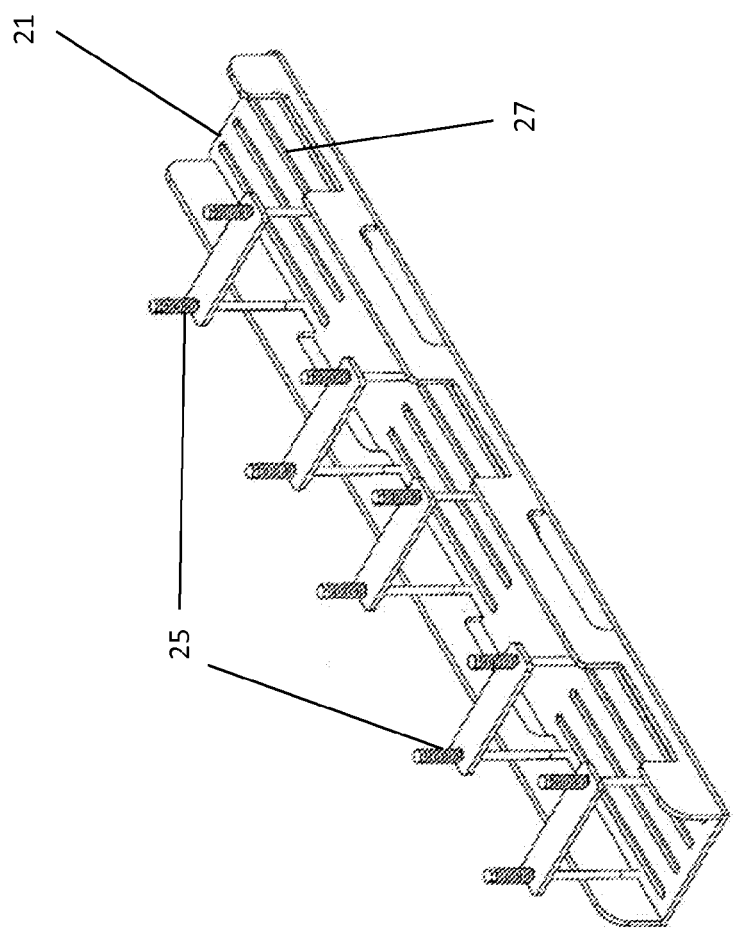
FIG. 10 is a perspective view of the push plate.

The first embodiment suspends the ram 18 from the frame 12 using single pivot arms 18a and 18b attached at either end of the assembly 20, as shown most clearly in FIG. 8. In contrast, the second embodiment suspends the ram 118 using a pair of pivot arms 118a and 118b attached at either end of the ram 118, as shown most clearly in FIG. 17A. Use of a pair of pivot arms 118a and 118b at either end of the ram 118 provides greater torsional support to the entire structure of apparatus 110 and the support of ram 118, as compared to the single ram pivoting support arms 18a and 18b used in the first embodiment.

Figure 28:
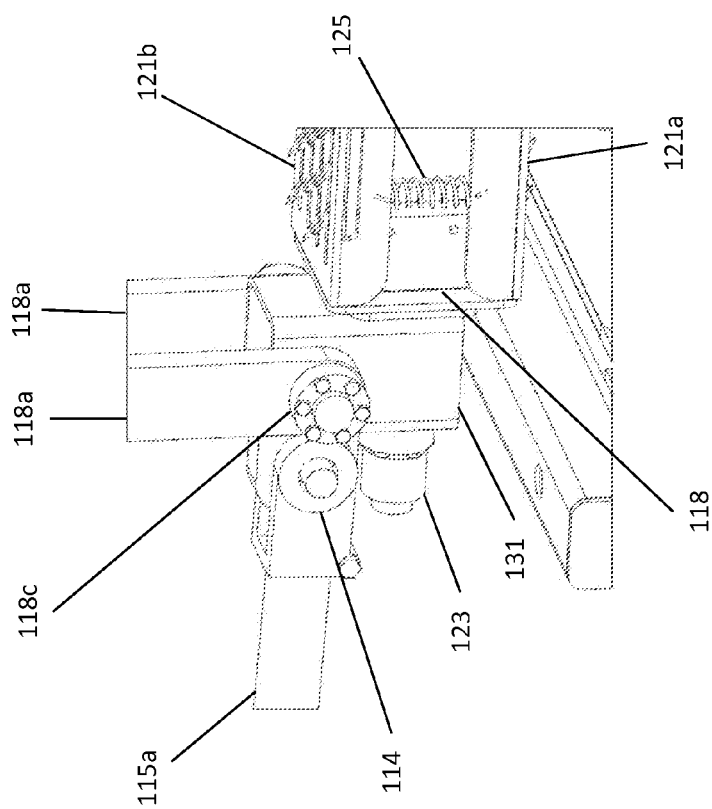
FIG. 28 is an partial perspective view of the mechanism coupling the ram to the drive cylinder of this invention.

FIG. 28 is an enlarged isolated view of the first end coupling by which ram 118 is coupled to drive cylinder 115 (not shown) via a drive piston 115a extending from the drive cylinder 115. The pair of pivoting support arms 118a are hingedly connected at their upper ends to the upper vertical cross member 112a of support frame 112, as shown in other figures, and likewise hingedly coupled to block member 131 at 118c at their lower end. Clearly observable in FIG. 28 is one of the plurality of tension springs 125 that connect opposing push plates 121a and 121b of assembly 120 to each other and bias the push plates 121a and 121b together. Block member 131 also rotatingly secures a drive axle 123 coupled to ram 118, the drive axle 123 also coupled to motor 124 (not shown in this figure). Block member 131 is also hingedly coupled to the distal end of piston 115a at 114.

In some embodiments, the apparatus 10, 110 is automatically controlled by a programmable logic controller through a control input 50, 150. In other embodiments, the apparatus is automatically controlled by a general purpose computer loaded with appropriate programming and in electronic communication with the apparatus.

In some embodiments, this invention pertains to a method of automatically removing a damaged board or slat from a pallet, including the steps of:

(a) providing a pallet;
(b) providing a ram assembly movable relative to the pallet, the ram assembly connected to a frame;
(c) identifying the position of a board to be removed from the pallet;
(d) translating the ram assembly to a position to engage the board;
(e) engaging the board with the ram assembly; and
(f) translating the ram assembly away from the pallet to remove the board from the pallet.

The method can further comprise (g) ejecting the predetermined board from the ram assembly. Step (g) may include initially rotating the ram assembly prior to ejecting the predetermined board from the ram assembly. Step (g) may include ejecting the board onto an optional conveyor configured to translate the board away from the ram assembly.

In certain embodiments, such as the disclosed first embodiment, the spikes are attached to a first side of the ram assembly and a rake is attached to a second side of the ram assembly. When the method is used with the first embodiment or similar embodiments of the apparatus, the method may include step (h), translating the ram assembly to move the rake across the pallet.

In certain embodiments, such as the disclosed second embodiment, the spikes are attached to a first side and a second side of the ram assembly.

When the method is used with the second embodiment or similar embodiments of the apparatus, the method may include (h) identifying the position of a second board to be removed from the pallet; (i) rotating the ram assembly to orient the second side in the direction of the pallet, in other words, downwards; (j) translating the ram assembly to a position to engage the second board; (k) engaging the second board with spikes on the second side of the ram assembly; and (l) translating the ram assembly away from the pallet to remove the second board from the pallet.

In some embodiments, step (c) includes securing the pallet in position relative to the ram assembly. In some embodiments, such as the disclosed first and second embodiments, securing the pallet includes inserting a spacer into the pallet then reversibly expanding the spacer to press against the pallet. In some embodiments, such as the first embodiment, expanding the spacer includes laterally expanding the spacer by inflating a bladder within the spacer. In certain embodiments, such as the second embodiment, the spacer includes a plurality of pads and wherein expanding the spacer includes translating the pads relative to each other to increase their width.

The translating of the ram in step (d) is translating the ram assembly parallel to a longitudinal axis of the board in the disclosed first and second embodiments. In other embodiments, the translating in (d) is translating the ram assembly perpendicular to a longitudinal axis of the board.

Figure 30:
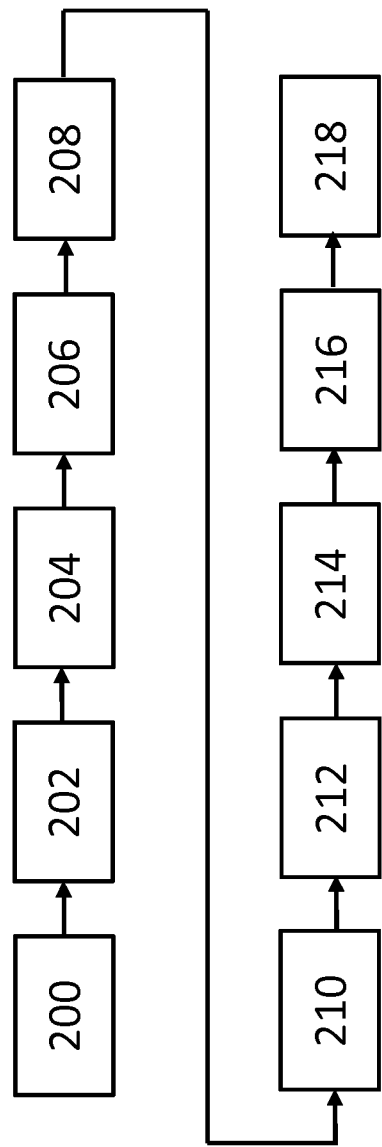
FIG. 30 is a flow chart reciting a method of removing a board from a pallet using the apparatus of the first embodiment.

FIG. 30 describes a method of removing a board from a pallet in further detail using the apparatus 10 of the first embodiment, the method including:

200—loading the pallet 16 onto the spacers 28, where initially the ram 18 is at the first position, the spacers 28 are closed or retracted, cam blocks 30a and 30b are disengaged, drive cylinder 15 is retracted, rotation cylinder 24 is retracted, ram 18 is positioned with the spikes 22 facing downwardly, and all air bladders 31 and 33 and air bags 23 are deflated;

202—securing the pallet in position by expanding the spacers 28 by inflating the bladder 31 and cam bladder 33, thereby reversibly locking the spacers 28 into their extended state by engaging the cam blocks 30a and 30b;

204—translating the ram 18 from the first position, through the second position, to the third position by extending the drive cylinder 15, the ram 18 engaging the board 16e' to be removed with the carried spikes 22 in the second position and removing the board 16e' in translating to the third position;

206—rotating the ram 18 90 degrees to orient the spikes 22 toward the front of the apparatus 10 and orient the rake 34 toward the pallet 16, the ram 18 being rotated by operation of the rotation cylinder 24;

208—ejecting the board 16e' by inflating the air bags 23 to operate the push plate 21 (the board 16e' is ejected onto the conveyor belt 40, if the optional conveyor belt is present).

Optional additional steps of this method include:

210—retracting the push plate 21 by deflating the air bags 23, whereupon springs 30 facilitate retraction of the push plate 21;

212—translating the ram 18 from the third position, through the second position, to the first position by retracting the drive cylinder 15, the ram 18 moving the rake 34 across the pallet 16 while transitioning through the second position;

214—rotating the ram 18 90 degrees to orient the spikes 22 downward, the ram 18 being rotated by operation of the rotation cylinder 24;

216—retracting the spacers 28 by deflating the bladder 31 and cam bladder 33, the tension springs 37 drawing the rail members 28a and 28b together and the cam springs 39 disengaging and separating the cam blocks 30a and 30b (this step may occur after or substantially simultaneously to step 214);

218—restarting at step 200 by selecting a second board for removal from pallet 16 or by removing the pallet 16 and providing a new pallet with a board for removal, or, alternatively, ending the process.

Figure 31:
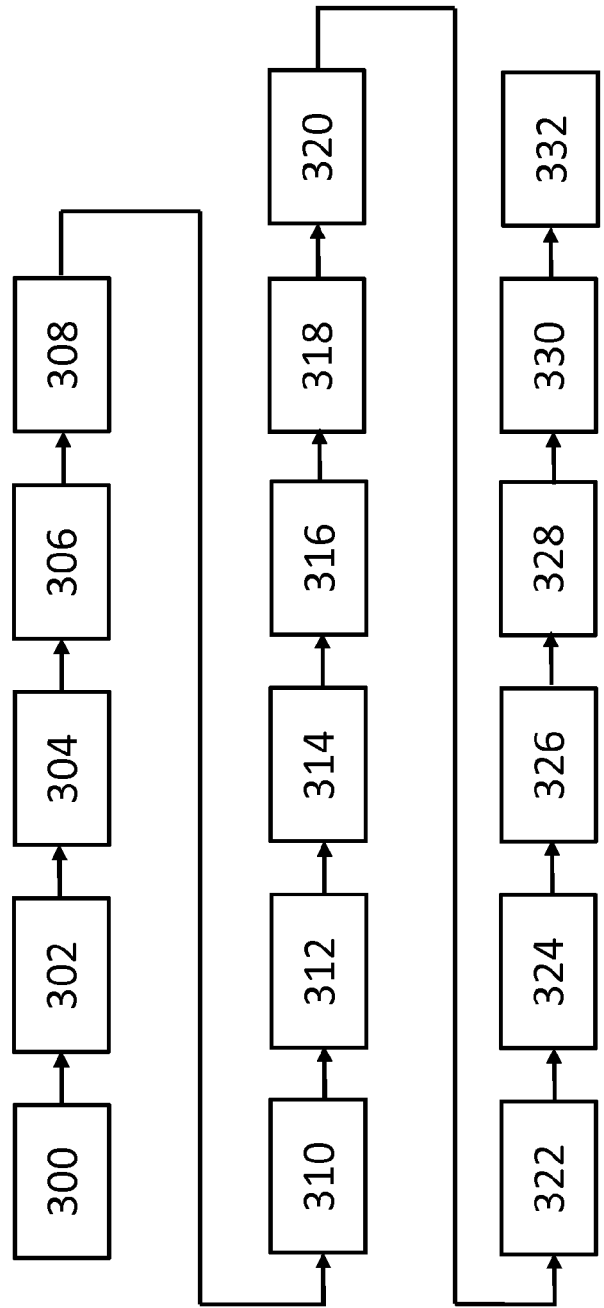
FIG. 31 is a flow chart reciting a method of removing a board from a pallet using the apparatus of the second embodiment.

FIG. 31 describes a method of removing a board from a pallet in further detail using the apparatus 110 of the second embodiment, the method including:

300—loading the pallet 16 onto the spacers 128, where initially the ram 18 is at the first position, the spacers 128 are closed or retracted, drive cylinder 115 is retracted, ram 118 is positioned with the spikes 122a facing downwardly, and air bags 123 are deflated;

302—securing the pallet 16 in position by expanding the spacers 128 by extending spacer cylinders 132, thereby sliding pads 130 into their extended state;

304—translating the ram 118 from the first position, through the second position, to the third position by extending the drive cylinder 115, the ram 118 engaging the board 16e' to be removed with the carried spikes 122a in the second position and removing the board 16e' in translating to the third position;

306—rotating the ram 118 90 degrees to orient the spikes 122a toward the front of the apparatus 110, the ram 118 being rotated by operation of the motor 124;

308—retracting the spacers 128 by retracting spacer cylinders 132, thereby sliding pads 130 into their retracted state (this step may occur after or substantially simultaneously with step 306);

310—ejecting the board 16e' by inflating the air bags 123 to operate the push plate 121a (the board 16e' is ejected onto a conveyor, if the optional conveyor is present).

Optional additional steps of this method include:

312—retracting the push plate 121a by deflating the air bags 123a, whereupon springs 125 facilitate retraction of the push plate 121a;

314—rotating the ram 118 90 degrees to orient the spikes 122b downward, the ram 118 being rotated by operation of the motor 124;

316—positioning a second board to be removed by either repositioning the pallet 16 on the spacers 128 or removing the pallet 16 and loading a new pallet on the spacers 128, the repositioned pallet 16 or new pallet collectively referred to as the current pallet;

318—securing the current pallet in position by expanding the spacers 128 by extending spacer cylinders 132, thereby sliding pads 130 into their extended state;

320—translating the ram 118 from the third position, through the second position, to the first position by retracting the drive cylinder 115, the ram 118 engaging the board to be removed from the current pallet with the carried spikes 122b in the second position and removing the board in translating to the third position;

322—rotating the ram 118 90 degrees to orient the spikes 122b toward the front of the apparatus 110, the ram 118 being rotated by operation of the motor 124;

324—retracting the spacers 128 by retracting spacer cylinders 132, thereby sliding pads 130 into their retracted state (this step may occur after or substantially simultaneously with step 322);

326—ejecting the board by inflating the air bags 123b to operate the push plate 121b (the board is ejected onto the conveyor, if the optional conveyor is present);

328—retracting the push plate 121b by deflating the air bags 123b, whereupon springs 125 facilitate retraction of the push plate 121b;

330—rotating the ram 118 90 degrees to orient the spikes 122a downward, the ram 118 being rotated by operation of the motor 124;

332—restarting at step 300 by selecting an additional board for removal from the current pallet or by removing the current pallet and providing a new pallet with a board for removal, or, alternatively, ending the process.

In some embodiments, the apparatus 10, 110 includes optional safety features to protect users from accidental contact with the moving parts of the apparatus or from splinters from pallets. In certain embodiments, the safety features includes guards, covers, mesh screens, gratings, or other structures configured to prevent contact between the user and the moving parts of the apparatus. In further embodiments, the frame includes a hinged Plexiglas cover attached to the frame. The user may open the hinged cover to access the ram 18, 118, for example, to pick splinters off of the spike plates 122. Preferably, a kill switch is connected to the hinged cover such that opening the cover automatically terminates all movement of the apparatus 10, 100. In some embodiments, the control system includes two buttons which must be simultaneously depressed by the operator while the apparatus 10, 110 is in operation. By requiring that the operator's hands be on the buttons, the operator is prevented from reaching into the apparatus 10, 110.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the invention are desired to be protected.

What is claimed is:

1. An automated board-removing apparatus comprising:
   a ram assembly carrying spikes and a push plate; and
   a spacer assembly configured to secure a pallet with a predetermined board of the pallet at an operable position;
   where the ram assembly is configured to move into a board-engaging position to enable said spikes to engage the predetermined board by puncturing the predetermined board, and to thereafter move away from the pallet to remove the predetermined board from the pallet; where the push plate is configured to eject the predetermined board from the spikes.

2. The apparatus of claim 1, wherein the ram assembly is suspended from a ram frame.

3. The apparatus of claim 2, further comprising a drive cylinder connected to the ram frame and the ram assembly, the drive cylinder operable to move the ram assembly between a start position, the board-engaging position, and an end position.

4. The apparatus of claim 3, wherein movement of the ram assembly between the start position, the board-engaging position, and the end position defines an arc, the board-engaging position being the lowest position of the arc.

5. The apparatus of claim 1, further comprising means for rotating the ram assembly.

6. The apparatus of claim 1, wherein the spacer assembly includes a spacer frame and at least one spacer extending therefrom.

7. The apparatus of claim 6, wherein the spacer is sized to extend within said pallet and configured to reversibly expand to press against an interior of the pallet.

8. The apparatus of claim 7, wherein the spacer includes two parallel rail members and an expandable bladder positioned between the rail members.

9. The apparatus of claim 8, further comprising springs connecting the rail members, the springs biased to draw the rail members together.

10. The apparatus of claim 7, wherein the spacer includes a plurality of pads, the pads configured to transition from a retracted state to an expanded state.

11. The apparatus of claim 10, wherein each pad is connected to the support frame by an actuating cylinder, whereby actuation of the cylinders transitions the pads from the retracted state to the expanded state.

12. The apparatus of claim 1, wherein the spikes extend through the push plate.

13. The apparatus of claim 1, wherein the spikes are carried on a first side of the ram assembly and a rake is carried on a second side of the ram assembly.

14. The apparatus of claim 1, wherein the spikes are carried on a first side and a second side of the ram assembly.

\* \* \* \* \*